United States Patent
Watanabe et al.

(10) Patent No.: US 6,961,462 B2
(45) Date of Patent: Nov. 1, 2005

(54) IMAGE PROCESSING METHOD AND IMAGE PROCESSOR

(75) Inventors: Tatsumi Watanabe, Fukuoka-ken (JP); Akio Kojima, Osaka-fu (JP); Yasuhiro Kuwahara, Fukuoka-ken (JP); Toshiharu Kurosawa, Fukuoka-ken (JP); Yusuke Monobe, Fukuoka-ken (JP); Hirotaka Oku, Osaka-fu (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 700 days.

(21) Appl. No.: 10/051,124

(22) Filed: Jan. 22, 2002

(65) Prior Publication Data

US 2002/0176622 A1 Nov. 28, 2002

(30) Foreign Application Priority Data

Jan. 22, 2001 (JP) ...................................... 2001-012756
Jan. 22, 2001 (JP) ...................................... 2001-012757

(51) Int. Cl.[7] .............................. G06K 9/00; G06K 9/34
(52) U.S. Cl. ...................... 382/164; 382/165; 382/166; 382/225
(58) Field of Search ............................... 382/162, 164, 382/166, 167, 225

(56) References Cited

U.S. PATENT DOCUMENTS

| 5,307,182 A | * | 4/1994 | Maltz ........................ 382/167 |
| 5,585,944 A | * | 12/1996 | Rodriguez .................. 382/166 |
| 5,825,917 A | * | 10/1998 | Suzuki ....................... 382/166 |

FOREIGN PATENT DOCUMENTS

| JP | 1-264092 | 10/1989 |
| JP | 2539361 | 7/1996 |

* cited by examiner

*Primary Examiner*—Phuoc Tran
(74) *Attorney, Agent, or Firm*—McDermott Will & Emery LLP

(57) ABSTRACT

In the invention, an input image is divided into plural small regions. The color data in each small region are classified to the present group, and plural components are selected in descending order of the variance from the representative color obtained from each group. The color data in the objective group is divided into plural groups in the direction of the selected component, and the representative color of each group is extracted. Such sequential group dividing and the representative color extracting are repeated until a specific number of representative colors are obtained. Therefore the high precise compression and approximation of image can be performed at high speed.

24 Claims, 29 Drawing Sheets

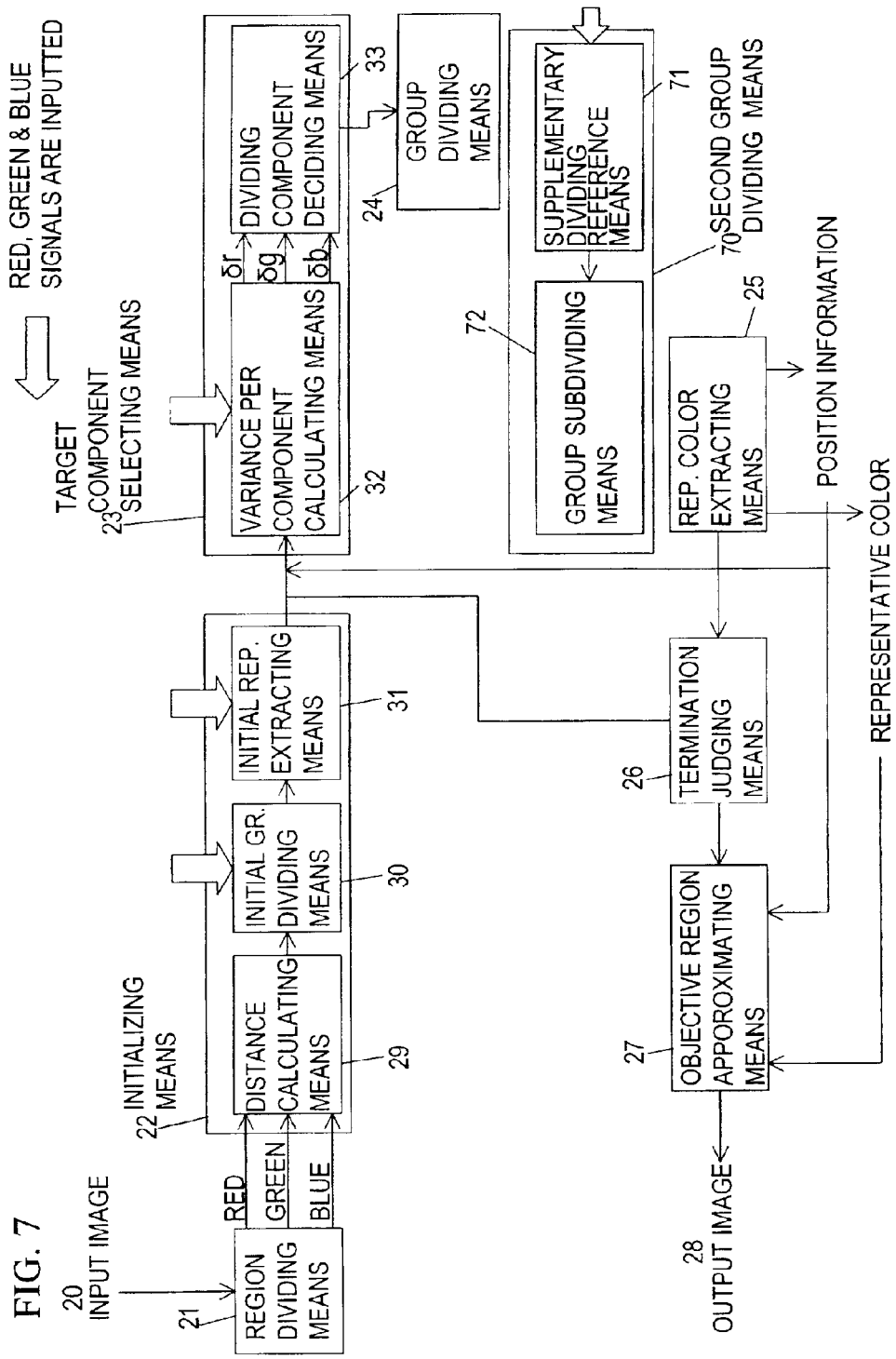

FIG. 22

PIXEL COORDINATES (i, j)

| (0,0) | (0,1) | (0,2) | (0,3) | (1,0) | (1,1) | (1,2) | (1,3) | (2,0) | (2,1) | (2,2) | (2,3) | (3,0) | (3,1) | (3,2) | (3,3) |

REPRESENTATIVE COLOR: | C0(r0,g0,b0) | C1(r1,g1,b1) |

POSITION INFORMATION:

STEP 1

| C0 | C0 | C1 | C1 | C0 | C0 | C1 | C1 | C0 | C0 | C1 | C1 | C0 | C0 | C1 | C1 |

STEP 2

| d0(r0,g0,b0) | d1(r1,g1,b1) | d2(r2,g2,b2) | d3(r3,g3,b3) |

| d0 | d2 | d1 | d1 | d0 | d0 | d1 | d1 | d2 | d2 | d3 | d3 | d2 | d2 | d3 | d3 |

| d0 | d2 | d1 | d1 | d0 | d0 | d1 | d1 | d2 | d2 | d3 | d3 | d2 | d2 | d3 | d3 |

STEP 3

| e0(r0,g0,b0) | e1(r1,g1,b1) | e2(r2,g2,b2) | e3(r3,g3,b3) | e4(r4,g4,b4) | e5(r5,g5,b5) | e6(r6,g6,b6) | e7(r7,g7,b7) |

| e0 | e4 | e1 | e1 | e0 | e0 | e7 | e7 | e6 | e6 | e3 | e3 | e2 | e2 | e5 | e5 | e4 | e4 | e1 | e1 |

| e0 | e4 | e1 | e3 |

REDUCTION ⇐ ORIGINAL ⇒ ENLARGEMENT : DOUBLE
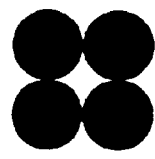
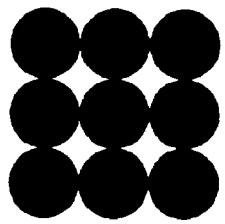
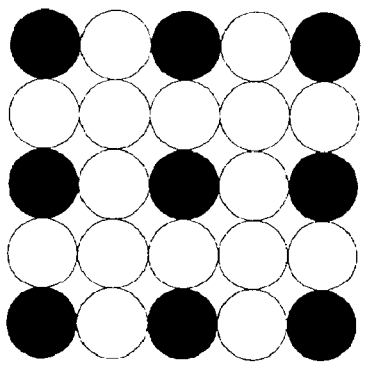
FIG. 25A
FIG. 25B
FIG. 25C

FIG. 27

| PROCESSING MODE | SETTING MODE | CONTROL PARAMETER | | |
|---|---|---|---|---|
| | | COMPRESSION RATIO | SIZE OF SMALL REGION | APPROXIMATE COLOR NUMBER |
| TEXT MODE | 1 | 1/6 | 4X4 | 2 |
| TEXT MODE | 2 | 1/3 | 4X4 | 4 |
| PHOTO MODE | 3 | 1/4 | 8X8 | 8 |
| PHOTO MODE | 4 | 1/6.4 | 16X16 | 8 |

US 6,961,462 B2

IMAGE PROCESSING METHOD AND IMAGE PROCESSOR

BACKGROUND OF THE INVENTION

1. Field of the Invention

The invention relates to an image processing method and an image processor for compressing and restoring color data.

2. Description of the Related Art

The color image has a huge size of data regarding colors. When the color data is displayed or transferred, it is used to apply the method of compressing the data size by approximating the color number of original color data with less color number.

As such method for compressing of color image, a method disclosed in Japanese Laid-open publication No. 61-252792 is well known. In the method, the red signal R, the green signal G and the blue signal B are independently handled one another. The method is explained hereinafter according to FIGS. 28 and 24. The image processor applying the method is provided with input means 2300a, 2300b and 2300c for each color of image independently, as shown in FIG. 29. Each of color data inputted through the input means 2300a, 2300b and 2300c is given to front-coding means 2301a, 2301b and 2031c. Each of the front-coding means 2301a, 2301b and 2301c calculates an average of color data. Based on the average, a specific block on color image is divided into two regions. Further, Data of pixels in the respective divided regions gets evened and thereby two representative values are calculated. According to the above processing, the block is divided into two regions in each color, and two representative values are calculated per color. By combining three colors of RGB, the region is divided into eight, two to the second power. And eight representative colors can be obtained, which represents the divided eight regions. Back-coding means 2302 detects the appearance frequency of eight colors in the block, and then extracts two colors among the eight colors as the representative colors of color data in the block. The obtained two representative colors are sent to decoding means 2303 via a communication medium or an interface like the Internet together with position information for approximating the pixel data in image with those representative colors. The decoding means 2303 prepares restored image by embedding the representative color in a specific pixel coordinates, and the restored image is outputted by output means 2304a, 2304b and 2304c.

Besides, the method of calculating the representative color by applying principal component analysis to RGB signals is also well known as another method, which is disclosed in Japanese Laid-open Publication No. 01-264092, for example. In this method, the colors (principal component colors) representing a specific block are determined according to the correlation among the RGB signals, and the block is divided according to the principal component colors, thereby the colors in the block are approximated with a specific number of colors.

However, the method disclosed in the Japanese Laid-open Publication No. 61-252792 handles respective RGB signals independently and gives no consideration to the correlation among the respective colors, so that it is easy to generate distortions on the restored image and impossible to obtain a good result in SN ratio (Signal to Noise Ratio) of evaluating the distortion degree quantitatively. Such problems have been noted frequently.

On the other hand, the principal component analysis used in the Japanese Laid-open Publication No. 01-264092 has the following problems. It is afraid that, since the principal component analysis requires the multidimensional matrix calculation in order to calculate the correlation among RGB signals, the amount of processing increases and it makes the hardware scale such as processing circuits bigger. Additionally, when the method was designed by the software processing using CPU and the like, it needs much calculation time.

SUMMARY OF THE INVENTION

The invention is proposed considering the above-mentioned subjects in the related arts, and has an object to provide the image processing method and image processor wherein the approximating of the color data in a small region can be performed with high precision and at high speed.

To achieve the above object, the invention adopts the following means.

In the invention, region dividing means divides an input image into plural small regions. A reference color table set includes a prepared set of reference colors, and color data classifying means divides the color data in the small region into a specific number of groups based on the color data in the small region and the reference colors in the table. Representative color deciding means finds a representative color of the color data in each of the obtained groups. And objective region approximating means approximates the color data in each small region by using a specific number of the obtained representative colors.

In case where a specific number of representative colors are obtained in this way, a specific number of groups are obtained based on the color data in the small region and the reference colors in the table, thereby the approximating of the color data in the small region can be performed at high speed.

The representative color deciding means finds the representative color of the color data in the group by using the calculation result of summed-up variance calculating means. The summed-up variance calculating means calculates the sum of variances from the average of the color data in each group obtained by the color data classifying means. In this case, by finding the representative color of which the sum of variances is small, the precision in the approximating can be ensured.

It is rightly said that there is a possibility that the approximating precision cannot be ensued enough by the prepared reference color set. Therefore, sequential representative color deciding means is provided in addition to the representative color deciding means, and sequential dividing reference value calculating means calculates a dividing reference value, and sequential division judging means may judges by the dividing reference value whether the sequential representative color deciding means should decide the representative color or not.

The sequential dividing reference value calculating means calculates a dividing reference value based on the average of the color data in each group obtained by the color data classifying means and the reference colors used by the color data classifying means. The sequential division judging means judges by the dividing reference value whether the sequential representative color deciding means should decide the representative color or not.

In case where the representative color is decided by the sequential representative color deciding means according to the judgment of the sequential division judging means, objective region approximating means approximates the color data in each small region by using a specific number of the representative colors obtained by the sequential representative color deciding means instead of the representative color deciding means.

The sequential representative color deciding means repeats from the dividing of an objective group into plural groups through the deciding of the representative color in each of the obtained groups. Then the dividing of an objective group is carried out along with target component selected based on the distribution of the color data in the objective group. And such processing is carried out until a specific number of representative colors are obtained. Therefore, since the approximating of color data is performed corresponding to the distribution of region, it is possible to improve the precision of the approximating. The processing of finding the representative color in sequence is performed only for the parts wherein the precision of the approximating cannot be ensured enough by the prepared reference color set, so that the approximating can be performed with high precision and at high speed in general.

In addition, it is possible to carry out the high precious and high speed approximating without the reference colors. For example, initializing means sets an initial group for the small region, classifies all the color data in the small region to the initial group, and finds the representative color of the initial group. Target component selecting means selects plural dividing target components to be targeted at the dividing of an objective group based on distribution of the color data in the objective group. Group dividing means divides the objective group into plural groups based on the obtained dividing target components and classifies the color data in the objective group to the groups obtained after the dividing. In this case, representative color extracting means finds a representative color of the color data in each group obtained by the group dividing means. Termination judging means judges whether a specific number of the representative colors are obtained or not. In case where, after repeating from the selecting of the dividing target components through the representative color extracting until a specific number of the representative colors are obtained, the termination judging means judges that a specific number of representative colors are obtained, objective region approximating means approximates the color data in the small region by using a specific number of the obtained representative colors.

Even in the case where a specific number of the representative colors are obtained in sequence as above, the group is divided with the plural dividing target components. Accordingly, the iteration of the repeat can be reduced the fewer. In result, the approximating can be performed with high precision and at high speed.

In case where the target component selecting means selects plural dividing target components, for example, variance per component calculating means calculates the variance of each component between a representative color of color data and each color data in an objective group. And dividing component deciding means selects dividing target components among components in descending order of the variance of the component obtained by the variance per component calculation means.

Regarding the components with the large variance, the group dividing is executed in sequence; thereby the approximating precision is high. It is rightly said that a user does not always request the high precise approximating. For example, there is a case where the user requests the high speed rather than the precision, or a case where the user requests only the precision enough to recognize the image like the thumbnail image. In this case, it is possible to use the representative colors obtained sequentially.

In order to achieve the object, retention judging means judges whether representative colors in respective grades established for the specific number are obtained. In case where the retention judging means determines the representative colors are obtained, graded coding retaining means retains the representative colors in the respective grades and position information for approximating the color data in the small region by using the representative colors. With User image quality selecting means, a user selects either one mode among image quality modes. Appropriate representative color reading means reads the representative colors and the position information corresponding to the selected mode from the graded coding retaining means according to the selection result by the user with the user image quality selecting means. In this case, the termination judging means judges whether a maximum specific number of the representative colors are obtained. After the termination judging means determines that a maximum specific number of the representative colors are obtained, the objective region approximating means approximates the color data in each of the small regions by using the representative colors obtained by the appropriate representative color reading means.

Thereby, the approximating is performed corresponding to the image quality mode instructed by the user at the receiving end, like the thumbnail mode, the high speed mode, and the extra fine mode. In result, it is possible to ensure the high user's flexibility.

In addition, in case of finding the representative color in sequence, the second group dividing means may be provided for carrying out the high precise and the high speed approximating. In this case, the target component selecting means does not need to select plural dividing target components.

The second group dividing means subdivides each group into plural groups based on the color data in each group obtained by the group dividing means, and classifies the color data in each group into the groups obtained after the dividing.

The representative color extracting means selects the representative color of the color data in each group obtained by the second group dividing means instead of the group dividing means.

In this case, each group is subdivided into plural groups based on the distribution of color data in each group obtained by the group dividing means, the iteration of the repeat can be reduced the fewer. Therefore, the approximating can be performed with high precision and at high speed. There is a case where the dividing by the group dividing means is performed only one time due to the dividing by the second group dividing means.

The second group dividing means may comprise supplementary dividing reference calculating means and group subdividing means. The supplementary dividing reference calculating means calculates a Euclid distance between the origin of color space and the color data in each group obtained by the group dividing means. The group subdividing means subdivides the group obtained by the group dividing means based on the calculation result of the supplementary dividing reference calculating means and classifies the color data in the objective group to the groups obtained after the subdividing.

As described above, the approximating precision can be ensured by using the Euclid distance between the origin of color space and the color data in each group.

Moreover, even in case of finding the representative color sequentially, if the representative color can be found sequentially only regarding the part of the small regions, in general the approximating is executed with high precision and at high speed.

For that, color data statistic calculating means calculates statistic distribution of the color data in the small region. Settled representative color use judging means judges, by comparing the statistic distribution of the color data and statistic distribution obtained from an extracted-from region from which the representative color has been extracted, whether the representative color in the extracted-from region is used or not. Similar region deciding means selects the extracted-from region having the maximum similarity to the small region. The color data classifying means divides the color data in the small region into a specific number of groups based on the distribution of color data in the small region and the representative color in the selected extracted-from region. Simplified representative extracting means extracts a representative color of the color data in the each group obtained by the color data classifying means. In case where the settled representative color use judging means determined that the representative color in the extracted-from region is used, the color data in each small region is approximated by using a specific number of representative colors obtained by the simplified representative color extracting means instead of the representative color deciding means.

In this way, if there are any extracted-from regions quite similar in the statistic distribution to the objective region, it is possible to find a specific number of representative colors using the representative color in the extracted-from regions. Thereby, the approximating is executed with high precision and at high speed in general. If there are consecutive regions with the very similar statistic distribution, the approximating speed can be improved remarkably.

Besides, the statistic distribution of the color data in the small region can be expressed by the histogram, for example.

In addition, the extracting processed regions may be set in proper. For that, sequential dividing object deciding means selects the region of which representative color is decided by the representative color deciding means among small regions. Regarding the regions selected by the sequential dividing object deciding means, the representative colors are found in sequence. The region selected by the sequential dividing object deciding means will be an extracted-from region. Adjacent similar region deciding means compares the statistic in the small region and the statistic obtained from an extracted-from region adjacent to the small region not selected by the sequential dividing object deciding means of the extracted-from regions, and selects an extracted-from region with the maximum similarity. In this case, the simplified representative extracting means divides the color data in the objective region into a specific number of groups based on the representative color of the extracted-from region selected by the adjacent similar region deciding means and then finds the representative color in each group. And regarding the small regions not selected by the sequential dividing object deciding means, objective region approximating means approximates the color data in each small region by using a specific number of representative colors obtained by the simplified representative extracting means.

In this way, after finding the representative color in the predetermined regions in sequence, the representative color for the other regions is found by using the representative color in the adjacent extracted-from regions. Thereby, it is possible to perform the approximating with high precision and at high speed in general. Besides, in order to restrain the dispersion of the precision, it is preferable that the regions where the representative colors are found in sequence are selected uniformly from the image.

BRIEF DESCRIPTION OF THE DRAWINGS

FIG. 7 is a block diagram showing a configuration of the image processor in the second embodiment of the invention.

FIG. 22 is a conceptual diagram showing the image information obtained by a graded coding retaining means of the image processor in the seventh embodiment of the invention.

FIGS. 25A to 25C are diagrams for illustrating the enlargement and reducing processing.

FIG. 27 is a diagram for illustrating the processing mode.

DESCRIPTION OF THE PREFERRED EMBODIMENTS

The following explanation discusses about the preferred embodiments of the present invention with reference to the drawings. Besides, of the terms noted in each embodiment, the "color data" indicates color signals at respective pixels, that is to say, represents data comprising three components of red, green and blue in the RGB color system. And the same numerals are given to common parts of each block diagram showing the image processor in respective embodiments.

Embodiment 1

Figure 2:
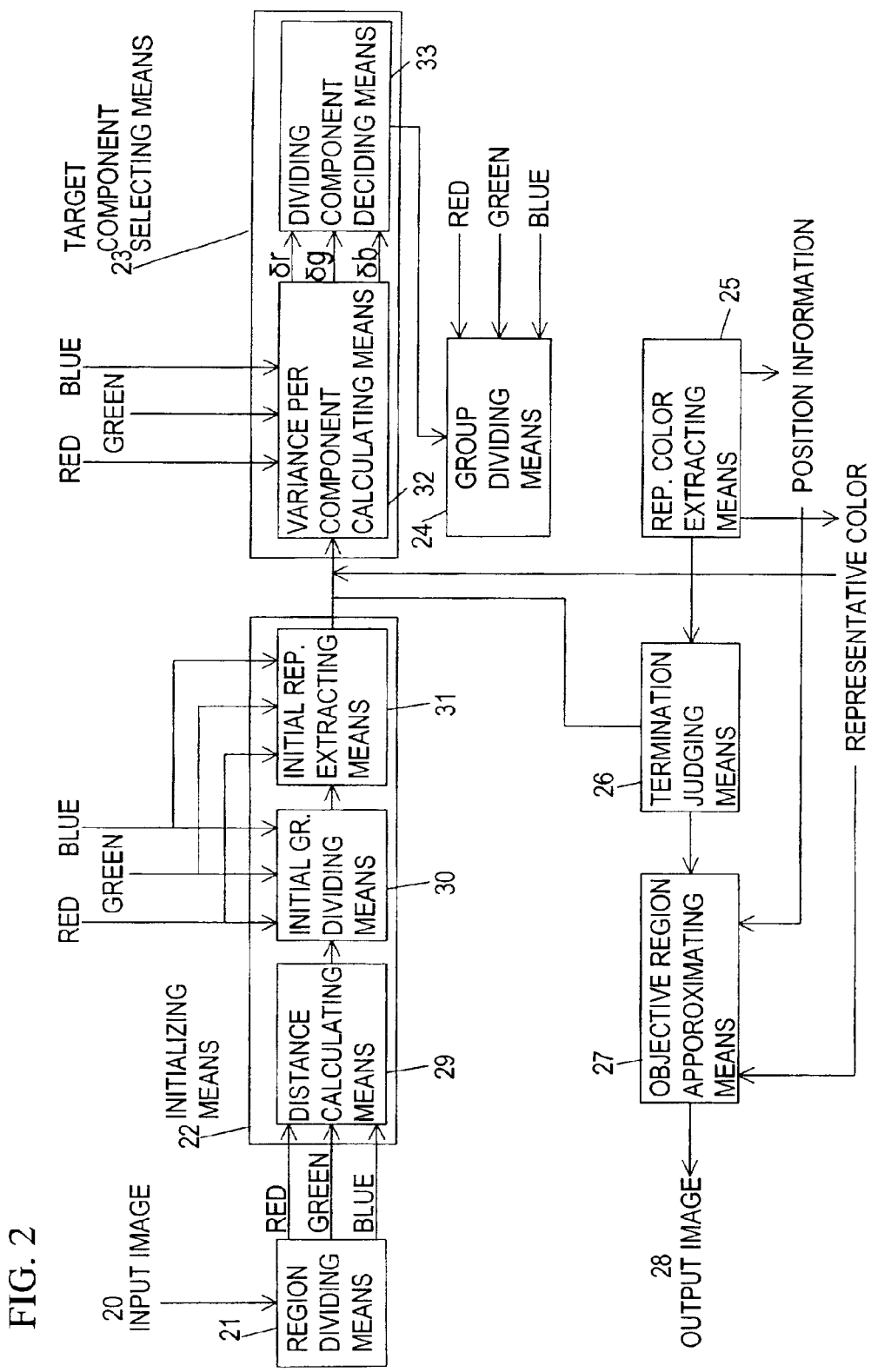
FIG. 2 is a block diagram showing a configuration of the image processor in the first embodiment of the invention.

First of all, the image processing method and the image processor in the first embodiment are explained hereinafter. In the image processor as shown in FIG. 2, region dividing means 21 divides an input image 20 into small block regions. Initializing means 22 sets an initial group when the color data in a block region to be an object is divided into groups in sequence. Target component selecting means 23 determines a target component at the group dividing on the basis of the distribution of color data in the objective group to be divided. Group dividing means 24 divides the objective group into a plurality of groups in accordance with the target component, and classifies the color data included in the objective group to the groups obtained after the dividing. Representative color extracting means 25 finds a representative color of the color data included in each group obtained by the group dividing means 24. Termination judging means 26 judges whether a given number of representative colors can be obtained or not. Objective region approximating means 27 approximates the color data in each block region by using a specific number of the obtained representative colors.

The initializing means 22 comprises distance calculating means 29 for finding the Euclid distance between the origin and color data included in the objective region, initial group dividing means 30 for classifying all the color data in the region to a plurality of groups based on the Euclid distance, and initial representative extracting means 31 for determining an average color of color data in each group obtained by the above means as a representative color of the group. The target component selecting means 23 comprises variance per component calculating means 32 for calculating the variance between the representative color of the color data in the objective group and each component of the color data in the objective group, and dividing component deciding means 33 for selecting dividing target components among the components in descending order of the variance of the component obtained by the variance per component calculating means and determining the selected components as the dividing target components at the group dividing.

Figure 1:
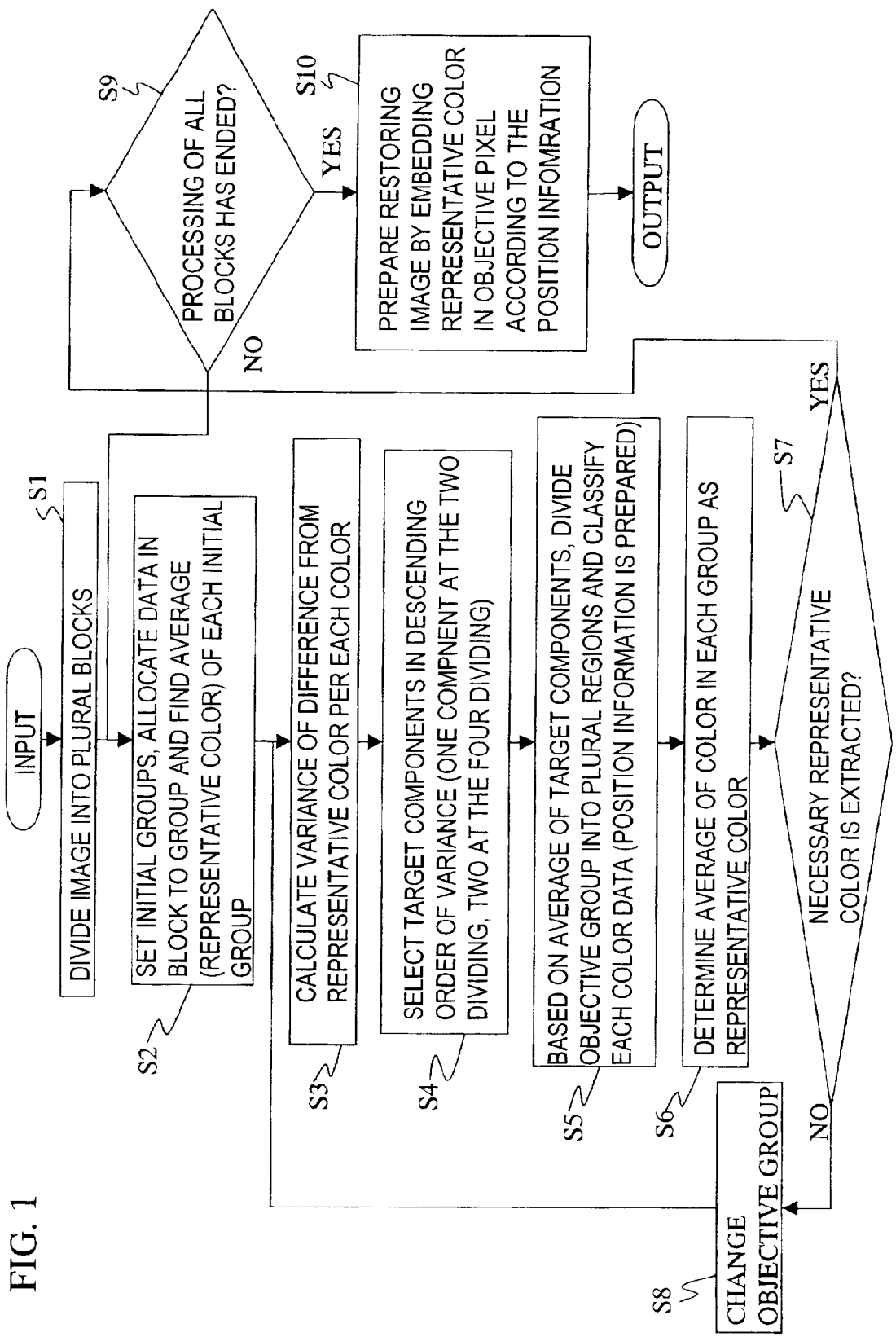
FIG. 1 is a flowchart for explaining the image processing method in the first embodiment of the invention.

The operation of the image processor and the image processing method in the first embodiment configured as above are explained according to FIG. 1. As shown in FIG. 1, the inputted color image 20 is divided into small block regions by the region dividing means 21 (S1). Since the number of color data in a small region is restricted to some extent, even though the small region is approximated with a small number of color data, such processing will not deteriorates the approximating precision. And the next representative color extracting is executed for each block region. In such processing, in order to carry out the high precision of the approximated image as mentioned hereinafter, the representative color extracting is executed so as to group the color data in the objective region and extract a representative color representing each group in sequence based on the statistic distribution of color data in the objective region.

Figure 5B:
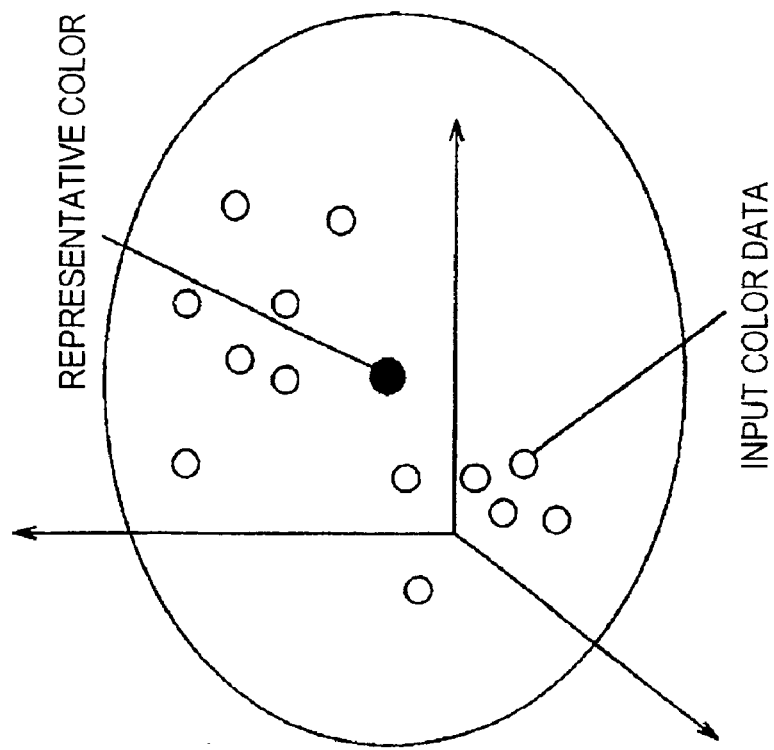
FIGS. 5A and 5B are conceptual diagrams schematically showing the processing of the initializing means of the image processor in the first embodiment of the invention.
Figure 5A:
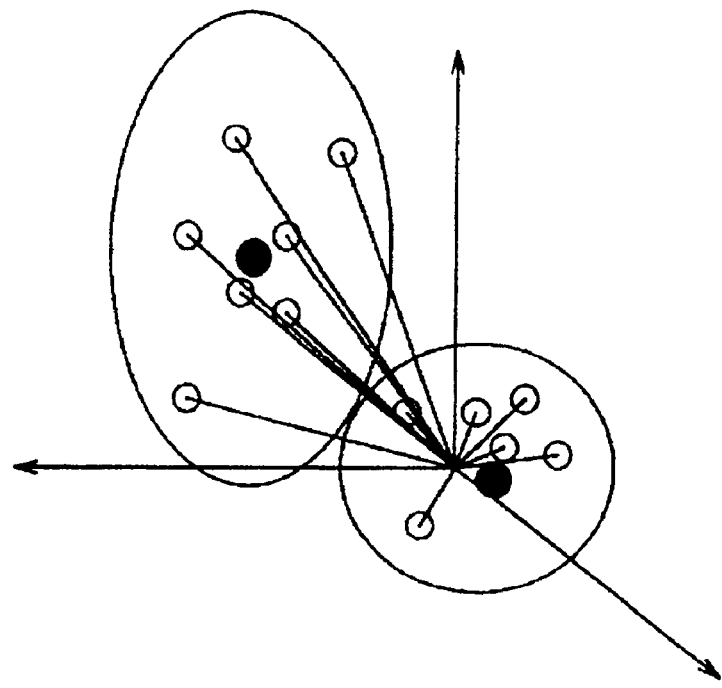

First, the initializing means 22 sets an initial group for the sequential dividing and the representative colors for the initial group (S2). The setting method is to set one initial group by classifying all the data in the objective block into one group, for example as shown in FIG. 5A; or to set and classify into a plurality of initial groups by using the Euclid distance between the origin and all color data in the objective region, for example as shown in FIG. 5B. The configuration of the block diagram shown in FIG. 2 assumes the method shown in FIG. 5B. The distance calculating means 29 calculates the Euclid distance length_k[j] between the origin and color data cIj(rj,gj,bj)(j=0, . . . , pxl_k) in the objective block. The initial group dividing means 30 divides the initial group into two groups based on Equation 1. At this time, ave_length_k indicates the average of the distance length_k[j] in the objective block k, and t_k_pix indicates all the pixel numbers in the objective block k. In addition, ||cIj|| indicates a vector length (norm) in case of the color data cIj is considered as a vector.

Equation 1:
$$\text{ave\_length\_k} = \sum_{j \in Bk} \|cIj\| / \text{t\_k\_pix}$$

where length_k[j]≧ave_length_k, j∈group 0
where length_k[j]<ave_length_k, j∈group 1

The initial representative extracting means 31 extracts the average of each color data included in the groups 0 and 1 as the representative color of this group. Besides, the initial group dividing means 30 sets the initial group to two, however the number is not unique, and it is possible to set the initial group to more than two. However, the number is preferable to be two so that the data in the block may be divided into groups precisely. Further, it is possible to set the initial group to one as shown in FIG. 5A. In this case, it is possible to skip the processing of the distance calculating means 29 and the initial group dividing means 30 in FIG. 2. At this time, since it causes to increase the iteration of the sequential processing up to detecting a specific number of representative colors, it is not possible to shorten the processing time, but it is possible to improve the extracting precision of representative colors and the precision of the approximate image obtained by the representative color extracting more than those of the method shown in FIG. 5B.

On the basis of the initial group, the target component selecting means 23, the group dividing means 24, the representative color extracting means 25, and the termination judging means 26 execute the processing of dividing the color data in the objective block one after another and extracting the representative color. The concrete example of such processing is shown schematically in FIG. 3. In this example, it is assumed that the dividing objective group S be divided into 4.

Figure 3C:
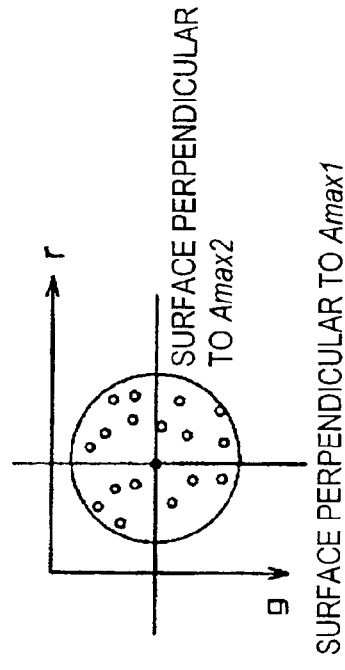
FIGS. 3A to 3D are conceptual diagrams schematically showing the processing of the representative color extracting means of the image processor in the first embodiment of the invention.
Figure 3D:
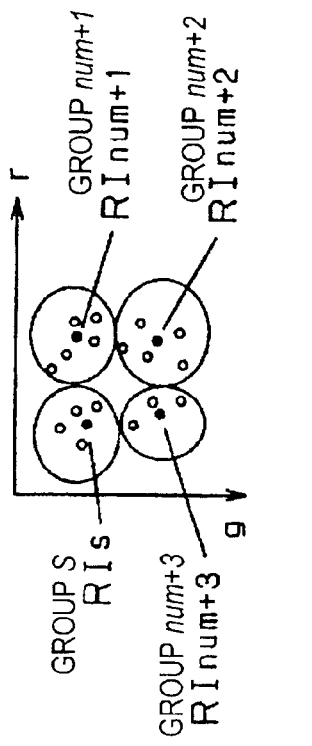
Figure 3A:
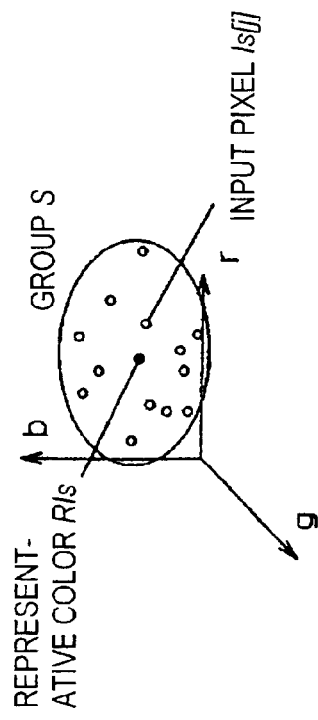

FIG. 3A shows the objective group S, the representative color RIs, and the color data of input pixel Is[j] on a space consisting of the r, g, and b axes. Here, it is assumed that the present dividing objective group S is set to group 1 (S=1), and the representative color RIs (Rrs,Rgs,Rbs) representing the present dividing objective group S is set to the representative color $RI_1^k$. The present representative cluster vector number num is defined as num=1, and the temporary parameter tnum is defined as tnum=1.

Figure 3B:
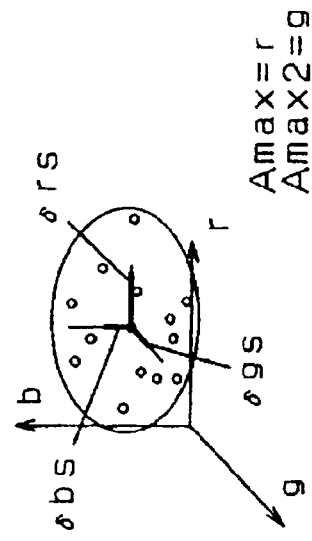

The variance per component calculating means 32 finds the sum (variance) δrs, δgs and δbs of the absolute deviation values of the representative color RIs per each axis of r, g and b axes regarding the Ns of pixel color data Is[j](rs[j], gs[j], bs[j]) included in the present dividing objective group S as shown in FIG. 3B (S3).

The dividing component deciding means 33 arranges the sum δrs, δgs and δbs of the absolute deviation values of the representative color RIs obtained in such way in descending order, and selects the axis Amax1 with the maximum value of the variance and the axis Amax2 with the subordinate value of the variance (S4). In FIG. 3B, the axis Amax1 with the maximum value is the r axis and the axis Amax2 with the subordinate value of the variance is the g axis.

FIG. 3C is a diagram taking FIGS. 3A and 3B from a view of the b axis. As shown in FIG. 3C, the group dividing means 24 divides the Ns of pixel color data Is[j] in the present group S into two groups in the Amax1 direction, and also into two groups in the Amax2 direction (S5). Thereby, the group S is divided into four groups.

The group dividing is executed based on the magnitude relation in the results of comparing the Amax1 component of the representative color RIs with that of each pixel color data Is[j] in the group S, and the Amax2 component of the representative color RIs and that of each pixel color data Is[j] in the group S. In FIG. 3C, the group is divided according to the equation 2.

Where $rs[j] \geq Rrs$ and $gs[j] \geq Rgs$, $j \in group$ num+2

Where $rs[j] \geq Rrs$ and $gs[j] < Rgs$, $j \in group$ num+1

Where $rs[j] < Rrs$ and $gs[j] \geq Rgs$, $j \in group$ num+3

Where $rs[j] < Rrs$ and $gs[j] < Rgs$, $j \in group$ S     Equation 2

Here, num indicates the number of groups before the dividing.

The representative color extracting means 25 determines each barycenter of four groups S, num+1, num+2 and num+3, those obtained by the above processing, as new representative colors RIs(Rrs, Rgs, Rbs),
RInum+1(Rrnum+1, Rgnum+1, Rbnum+1),
RInum+2(Rrnum+2, Rgnum+2, Rbnum+2), and RInum+3 (Rrnum+3, Rgnum+3, Rbnum+3) (S6). And the representative color number num is determined as num=num+3.

Figure 4:
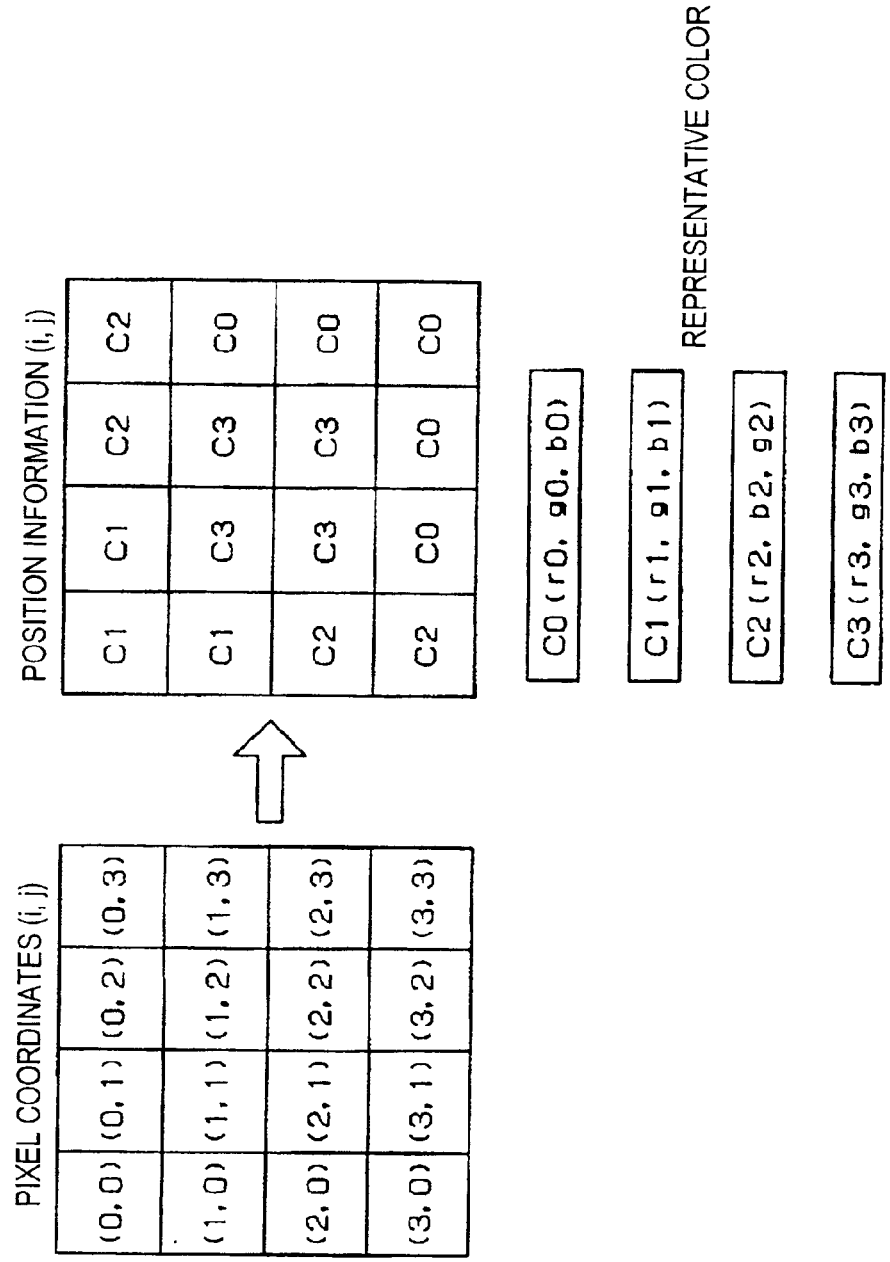
FIG. 4 is a conceptual diagram showing necessary information for approximating each small region by the image processor in the first embodiment of the invention.

The representative color extracting means 25 retains temporarily the obtained representative colors and the position information for indicating which representative color should approximate a pixel in the block. The representative color is used again to calculate the variance of each component with the variance per component calculating means 32 at the subdividing. FIG. 4 shows the information retained at this time.

When S does not reach tnum and the necessary representative colors are not extracted (S7), the number S representing the present dividing objective group is set to S=S+1 and the objective group is changed (S8), and then the steps from step S3 are repeated.

When S reaches temporary parameter tnum, it is judged whether num reaches the representative color number c_num determined in advance (S9). Then if does not reach, S=1 and tnum=num is set. And the steps from Step S2 are executed. Such termination judgment is executed by the termination judging means 26.

A specific number c_num of representative colors extracted by the above processing are retained together with the position information indicating which representative color should approximate color data of a pixel in the block. And by utilizing the retained information, the objective region approximating means 27 in the approximating and restoring end restores the pixel data in each block region (S10). The position information (i, j) corresponds to the pixel coordinates (i, j) in the objective block. The representative color embedded in this position information coordinates is embedded in the corresponding pixel coordinates, thereby the restored image is prepared and the output image 28 can be obtained. Besides, the embodiments explained about an example that the dividing objective group S is divided into four, but it is possible to consider the method of dividing only in the direction of the axis Amax1 with the maximum variance (the dividing into two pieces). In such case, it is expected that the extracting precision of representative color can be improved more than in case of the dividing into 4 pieces, and it is possible to ensure the high precision of the output image finally obtained. However, since the iteration of the processing increases for the sequential dividing, the processing speed is delayed a little. In addition, the dividing objective group can be divided into 8 pieces. In this case, it is possible to skip the processing of the variance per component calculating means 32 and the dividing component deciding means 33, and the extracting of representative colors can be performed at high speed. However, since there is a great possibility of deteriorating the extracting precision, it may be also considered that means for controlling the number to divide the dividing objective group according to the purpose can be added. Likewise, it can be considered that after finding the color data distribution in the objective block region, the number to divide the objective group be controlled based on the fuluctuation of the distribution.

As described above, the invention of this embodiment executes the processing of extracting representative color to represent each group after dividing the small regions into plural groups in one color direction after another according to the average of color data in the small region or the variance from the average, therefore it is possible to perform the region dividing and the extracting of representative color to represent each region with high precision at high speed.

Besides, those processing can be also carried out by the software processing using the central processing unit (CPU) applied to the computer, the digital signal processor (DSP) and the like according to the image processing method in the first embodiment of the invention. Moreover, those processing can be also carried out by using the semiconductor chip prepared based on the image processing method in the first embodiment of the invention.

Embodiment 2

The following description explains about the image processor and image processing method in the second embodiment of the invention. In the image processor shown in FIG. 7, a second group dividing means 70 subdivides the plurality of groups obtained by the group dividing means 24 into a plurality of groups based on the color data and classifies the color data in the objective group to groups obtained after the subdividing.

The second group dividing means 70 comprises supplementary dividing reference calculating means 71 for calculating the Euclid distance between the origin and data in the group obtained by the group dividing means 24, and group subdividing means 72 for subdividing the group obtained by the group dividing means 24 into lots based on the supplementary dividing reference value and classifying the color data of the objective group to the groups obtained after the subdividing.

Figure 6:
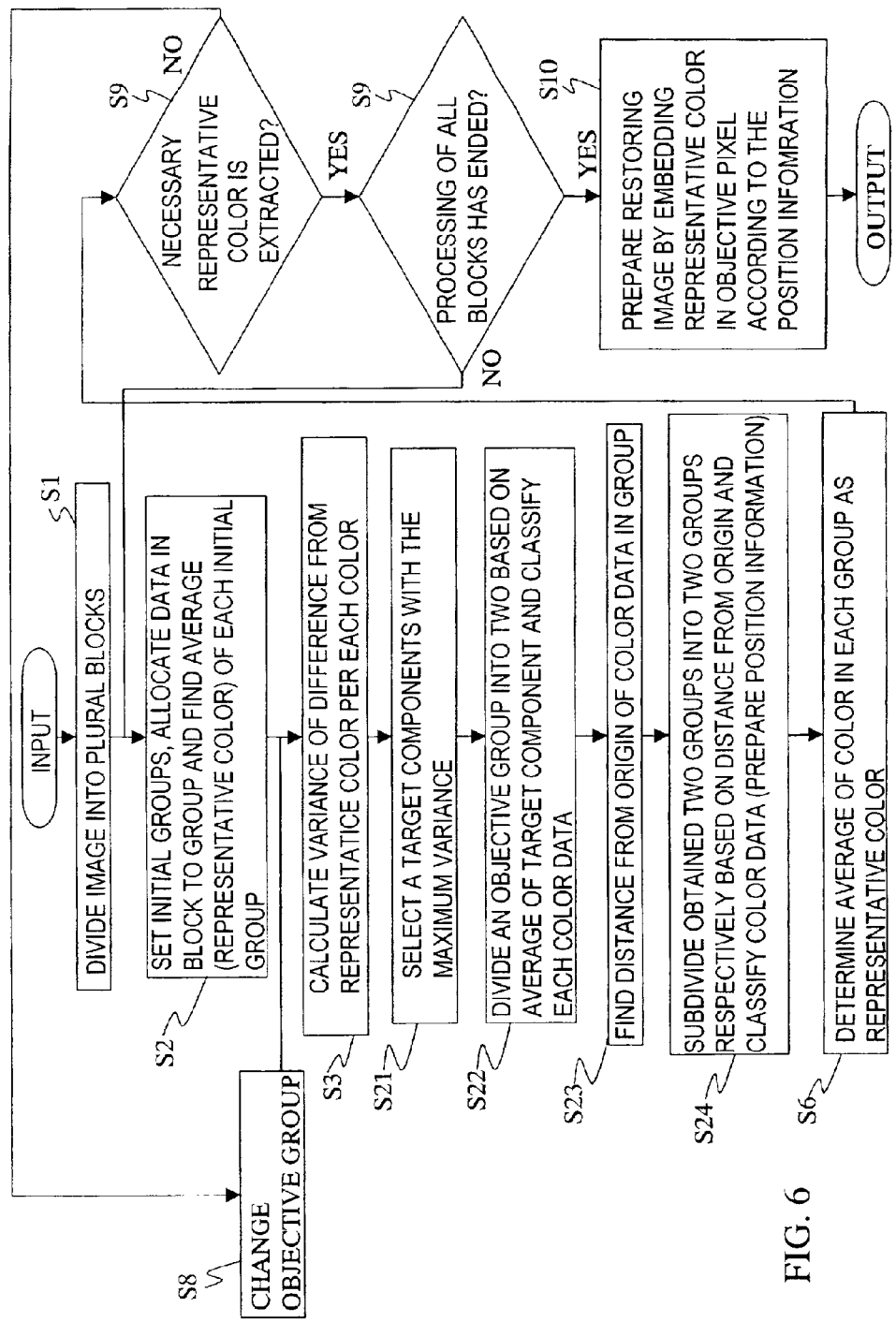
FIG. 6 is a flowchart for illustrating the image processing method in the second embodiment of the invention.
Figure 8C:
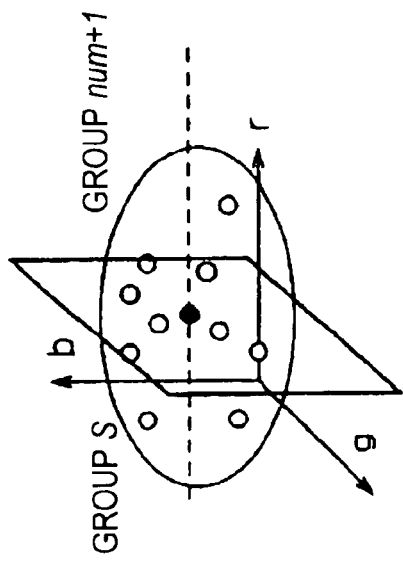
FIGS. 8A to 8D are conceptual diagrams schematically showing the processing of the second group dividing means of the image processor in the second embodiment of the invention.
Figure 8D:
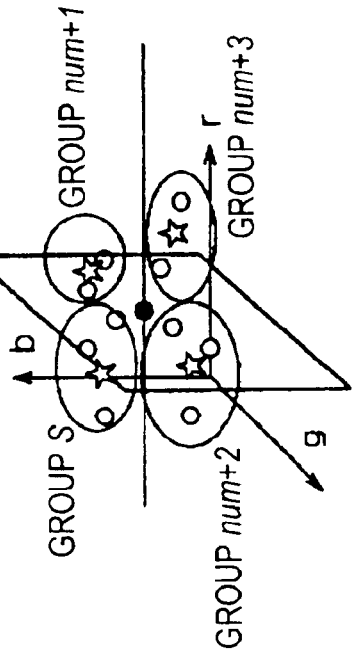
Figure 8A:
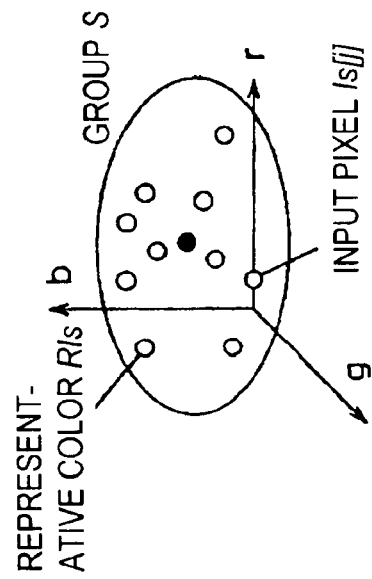
Figure 8B:
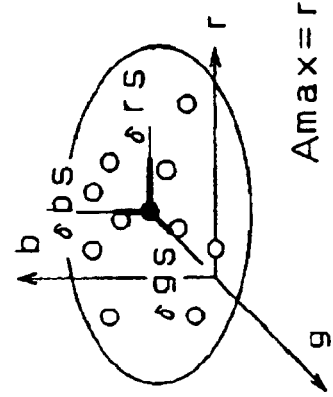

The operation of the image processor and the image processing method in the second embodiment configured as above are explained with reference to the flowchart in FIG. 6. Additionally, FIG. 8 shows schematically the example of the group dividing in this embodiment. Like the image processor and the image processing method in the first embodiment, the input image 20 is divided into a plurality of blocks (S1), and then the initializing means 22 sets a specific number of initial groups and representative colors (S2). After that, as shown in FIG. 8B, the variance per component calculating means 32 calculates the variance δrs, δgs and δbs from the representative color of color data in the group S regarding the dividing objective group S as shown in FIG. 8A (S3). The dividing component deciding means 33 selects the component Amx with the maximum variance on the respective r, g and b axes as a dividing target component (S21). In the example of FIG. 8B, the r axis is selected as the dividing target component. As shown in FIG. 8C, the group dividing means 24 divides the objective group into two lots along the component Amax, and after comparing the component Amax of the representative color and that of each pixel color data Is[j] included in the group S, classifies the color data to the two group based on the magnitude relation (S22). The groups obtained here are defined newly as a group S and a group num+1. Besides num indicates the number of groups before the dividing.

Next, the second group dividing means 70 subdivides the group S and the group num+1 into further two groups respectively. At this time, the supplementary dividing reference calculating means 71 finds the Euclid distance len between the origin and pixel color data included in the groups S and num+1 (S23). And the group subdividing means 72 subdivides the group S into the group S and the group num+2 on the basis of the average of the distance of the pixel color data in the group S, and classifies each color data to them respectively. Likewise, the group num+1 is subdivided into the group num+1 and the group num+3, and the color data of the group num+1 is classified (S24). Thereby, it is possible to reduce the iteration of the processing of dividing the group, and to perform the group dividing at high speed.

The representative color extracting means 25 finds the average of the color data in the group obtained at this time, which is determined to be the representative color of the group (S6). The termination judging means 26 judges whether a specific number of representative colors are extracted or not (S7), if not, after the objective group is changed (S8), the processing is repeated from Step 3 executed by the variance per component calculating means 32. On the other hand, when it is determined that the extracting of representative colors is completed, if the processing for all the blocks has ended (S9), at the time of approximating the image, the approximate image of the input image is prepared based on the representative color obtained by the objective region approximating means 27 and the position information for approximating each pixel color data, thereby the output image is obtained (S10).

As described above, after dividing the color data into two groups in the color direction with the maximum value of the average of color data in the small region or the variance from the average, the invention in this embodiment subdivides the group into lots based on the distance from the origin of color data in the group, therefore it is possible to reduce the iteration of the processing for the group dividing.

Besides, those processing can be also carried out by the software processing using the central processing unit (CPU) applied to the computer, the digital signal processor (DSP) and the like according to the image processing method in the second embodiment of the invention. Moreover, those processing can be also carried out by using the semiconductor chip prepared based on the image processing method in the second embodiment of the invention.

Embodiment 3

Figure 10:
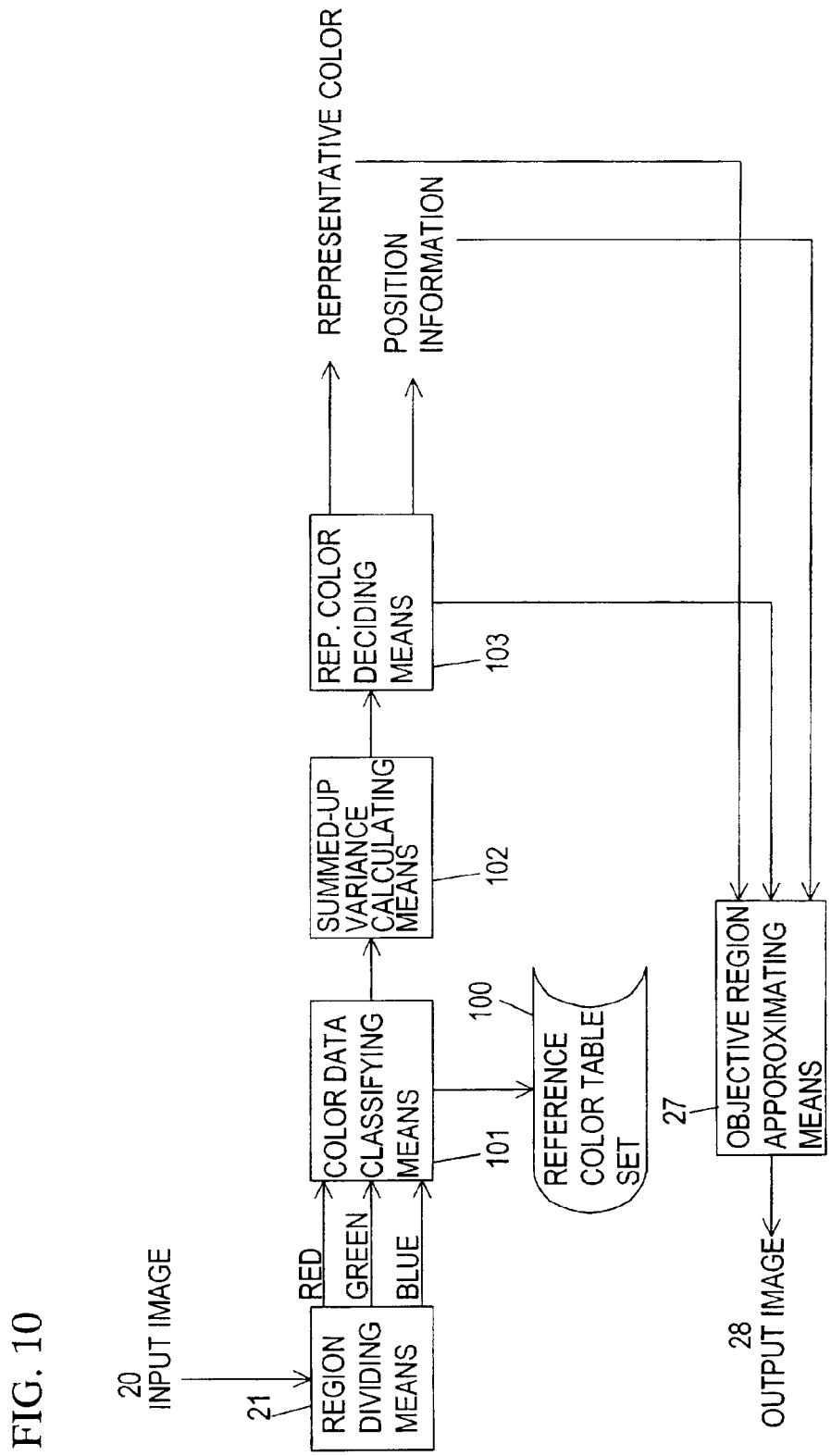
FIG. 10 is a block diagram showing a configuration of the image processor in the third embodiment of the invention.

The following description explains about the image processor and the image processing method in the third embodiment of the invention. FIG. 10 shows the configuration of the image processor in the third embodiment. In the image processor shown in FIG. 10, a reference color table set 100 is provided with a reference color set prepared in advance. Color data classifying means 101 classifies the color data in the small region into a specific number of groups based on the color data in the objective block region and a reference color set in the reference color table set. Summed-up variance calculating means 102 calculates the sum of variances from the average in each group. The representative color deciding means 103 selects one group from a plurality of groups classified by the color data classifying means 101 and finds the representative color of the color data in the obtained group.

Figure 9:
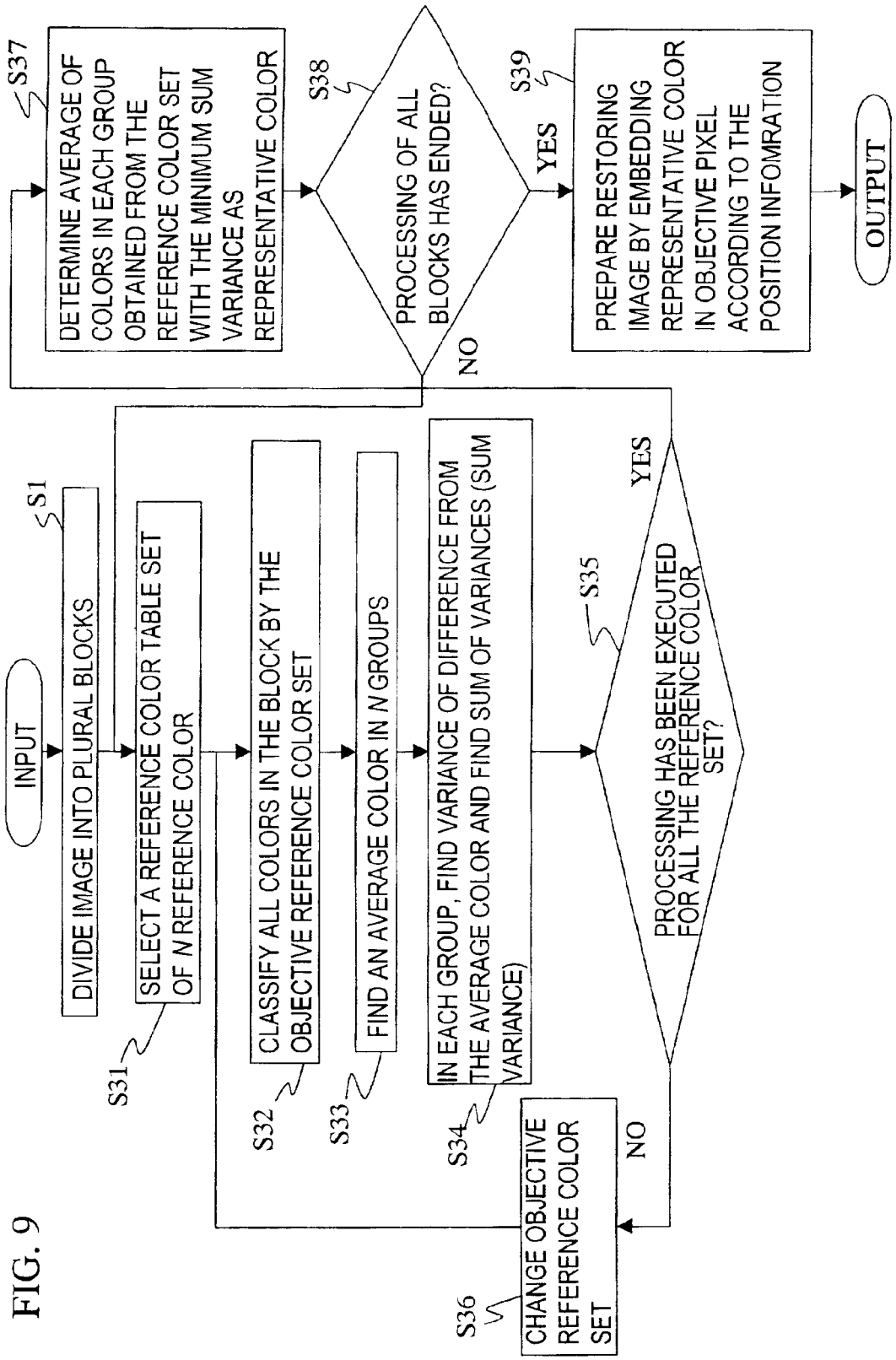
FIG. 9 is a flowchart for illustrating the image processing method in the third embodiment of the invention.

The operation of the image processor configured as above and the image processing method in the third embodiment are explained according to the flowchart shown in FIG. 9.

The input image 20 is divided into a plurality of small block regions by the region dividing means 21 (S1). And the representative color is extracted for each block region, which is the same as in the first embodiment. In the third embodiment, however, first an initial group is set in the objective block, and then the group dividing is repeated one after another. In the third embodiment, an appropriate set of n reference colors is selected from the table set prepared in advance. On the basis of the reference colors in the table set, the pixel color data in the objective block is classified to the n groups, and then the representative color representing each group is extracted.

It is for preparing the reference table set 100 that the image processing in the first embodiment is available, for example. In this case, many image samples have been processed in advance like the image processing in the first embodiment; thereby it is possible to determine KK sets of specific n representative colors. The KK sets may be put to a table as the KK sets of reference colors. In addition, by applying the statistical method like the vector quantization to the vector comprising the KK sets of n representative colors, LL sets of n reference colors may be prepared. Instead of the statistical method, it is possible to apply the method like Kohonen's self-organizing neural network.

The average image like the following characteristic images can be utilized for preparing the set of representative colors: textures, texts, images where the vibration of color data are comparatively small, and so on, for example. In this case, after preparing the average image of each image, the each average image is processed like the image processing in the first embodiment, thereby a set of the representative colors is prepared. Even in this case, the set of representative colors may be put to a table as a same number of sets of the reference colors, and otherwise put to a table as different number of sets of the reference colors obtained by the vector quantization. In addition, without preparing another image separately, it is possible to apply the representative colors of the block processed regarding the same image to a set of the reference colors.

For preparing the set of representative colors for each classification object such as the human's skin, the plant, the sky and so on, the block obtained by dividing the plural images prepared in advance may be utilized. In this case, after classifying each block according to the proportion of each classification object, from the classified block the representative color is extracted. The set of representative colors found in such way may be put to a table as the reference colors for the corresponding classification object without change, or may be put to a table by using the vector quantization method like the other examples.

Additionally, it is not necessary that the number of representative colors in each set should be n equally, but it may be variable. In such case, the n levels of the representative color sets obtained from many image samples are prepared for KK sets in the same way, and plural sets of reference colors detected from the KK sets of representative colors on each level according to the above-mentioned method may be put to tables, thereby the reference color table set 100 can be prepared.

Figure 11:
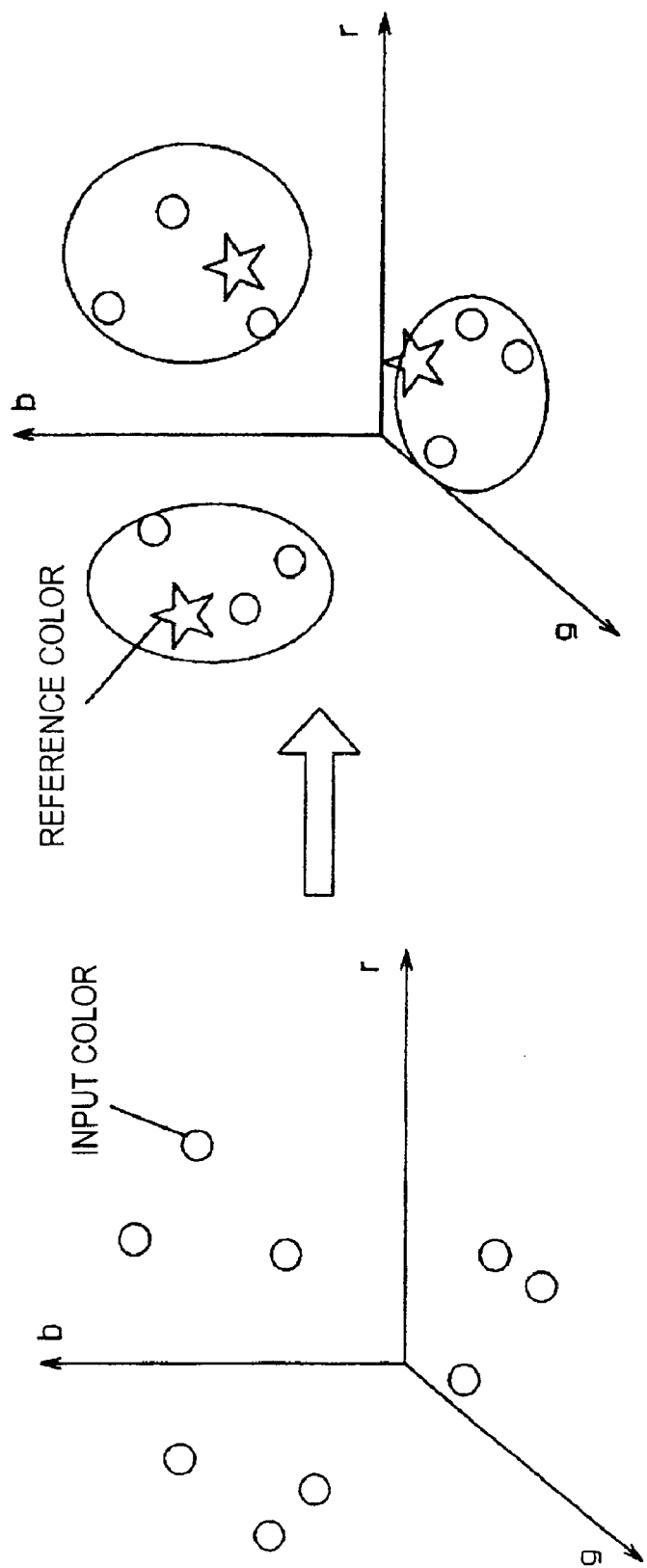
FIG. 11 is a conceptual diagram schematically showing the processing of the color data classifying means of the image processor in the third embodiment of the invention.

The color data classifying means 101 selects the m-th set of n reference colors dRIt_m (t=0, ..., n−1) among the reference color table set 100 (S31). And as shown in FIG. 11, k pixels data I_k[j] in the block is classified to n groups by this reference color set (S32). The classification is performed based on the distance between the reference color set dRIt_m(t=0, ..., n−1) and the pixel data I_k[j], for example. The pixel data I_k[j] is classified to a group t of reference colors with the minimum distance. After this, the averages in n groups are found (S33). After finding the variance from the average in each group, the sum δ_m of the variances from the average in each group is calculated in case of using the m-th set of reference colors (S34). After this processing is performed regarding all the reference color sets (S35, S36), the representative color deciding means 103 determines the average obtained from the reference color set m with the minimum sum of variances as the representative color obtained regarding the objective block region k (S37). And the position information for the pixel data in the block at this time was retained together with the representative color. If the processing for all the blocks was completed (S9), the objective region approximating means 27 prepares the output image 28 by using the representative colors and the position information at the time of the restoring (S10).

In this way, without performing the group dividing sequentially like the image processing method and image processor in the first and second embodiment, it is possible to divide the color data in the objective region and extract representative colors from it at high speed. And by preparing in advance a plurality of reference color sets with high precision prepared from many image samples, the extracting of representative colors can be performed accurately regardless of the input image and it is possible to restrain the deterioration of image quality of the images restored and approximated.

Besides, those processing can be also carried out by the software processing using the central processing unit (CPU) applied to the computer, the digital signal processor (DSP) and the like according to the image processing method in the third embodiment of the invention. Moreover, those processing can be also carried out by using the semiconductor chip prepared based on the image processing method in the third embodiment of the invention.

Embodiment 4

Figure 13:
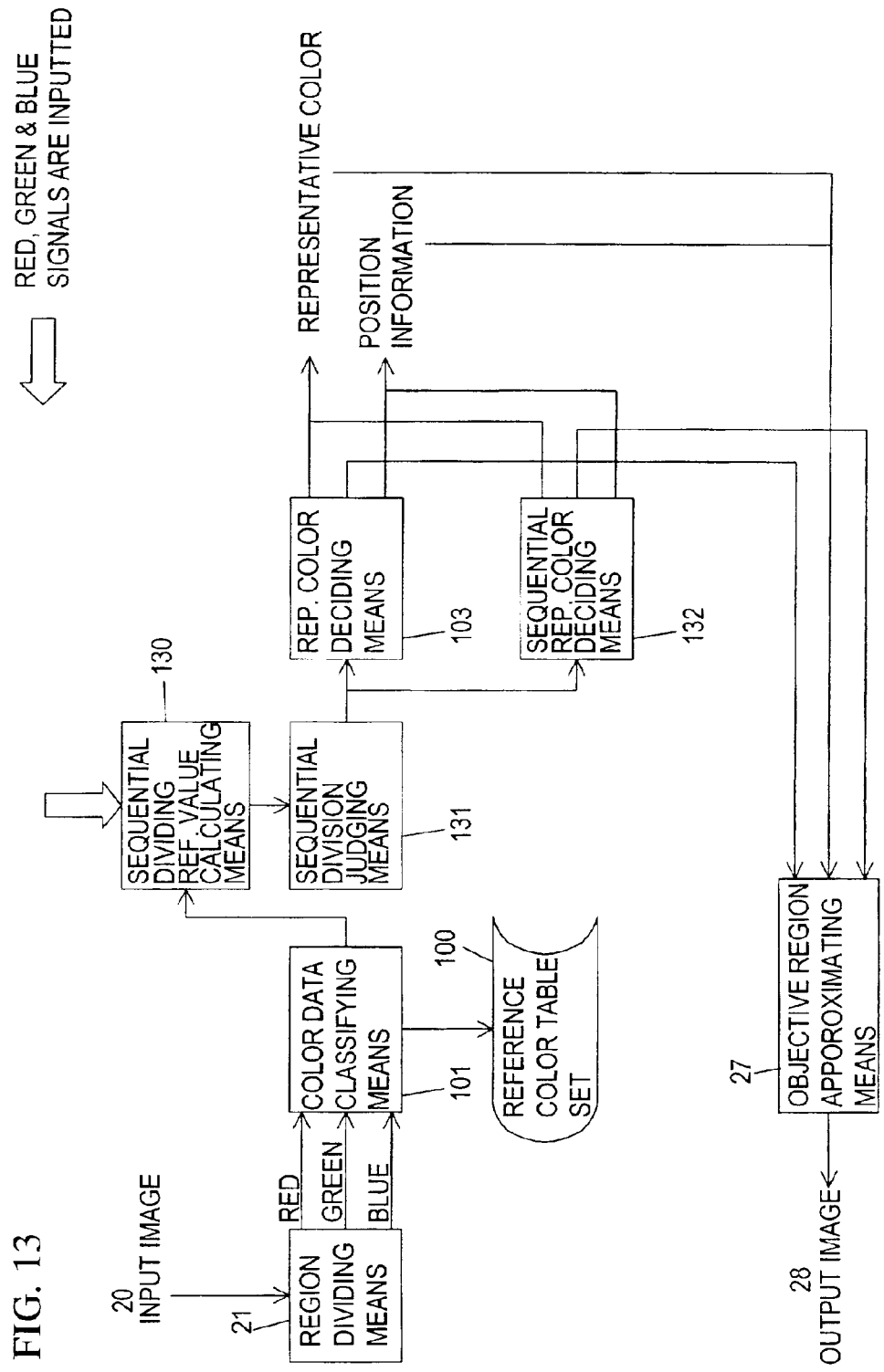
FIG. 13 is a block diagram showing a configuration of the image processor in the fourth embodiment of the invention.

Next, the following description explains about the image processing method and the image processor in the fourth embodiment. In the image processor shown in FIG. 13, sequential dividing reference value calculating means 130 calculates the dividing reference value from the average in each group obtained by the color data classifying means 101 and the reference colors used by the color data classifying means 101. Sequential division judging means 131 judges based on the dividing reference value whether the representative color is selected from the average obtained here or not. In case where the sequential division judging means 131 determines that the sequential dividing is performed, sequential representative color deciding means 132 divides the color data in the small region into groups sequentially and then find the representative color of the color data included in each group.

Figure 12:
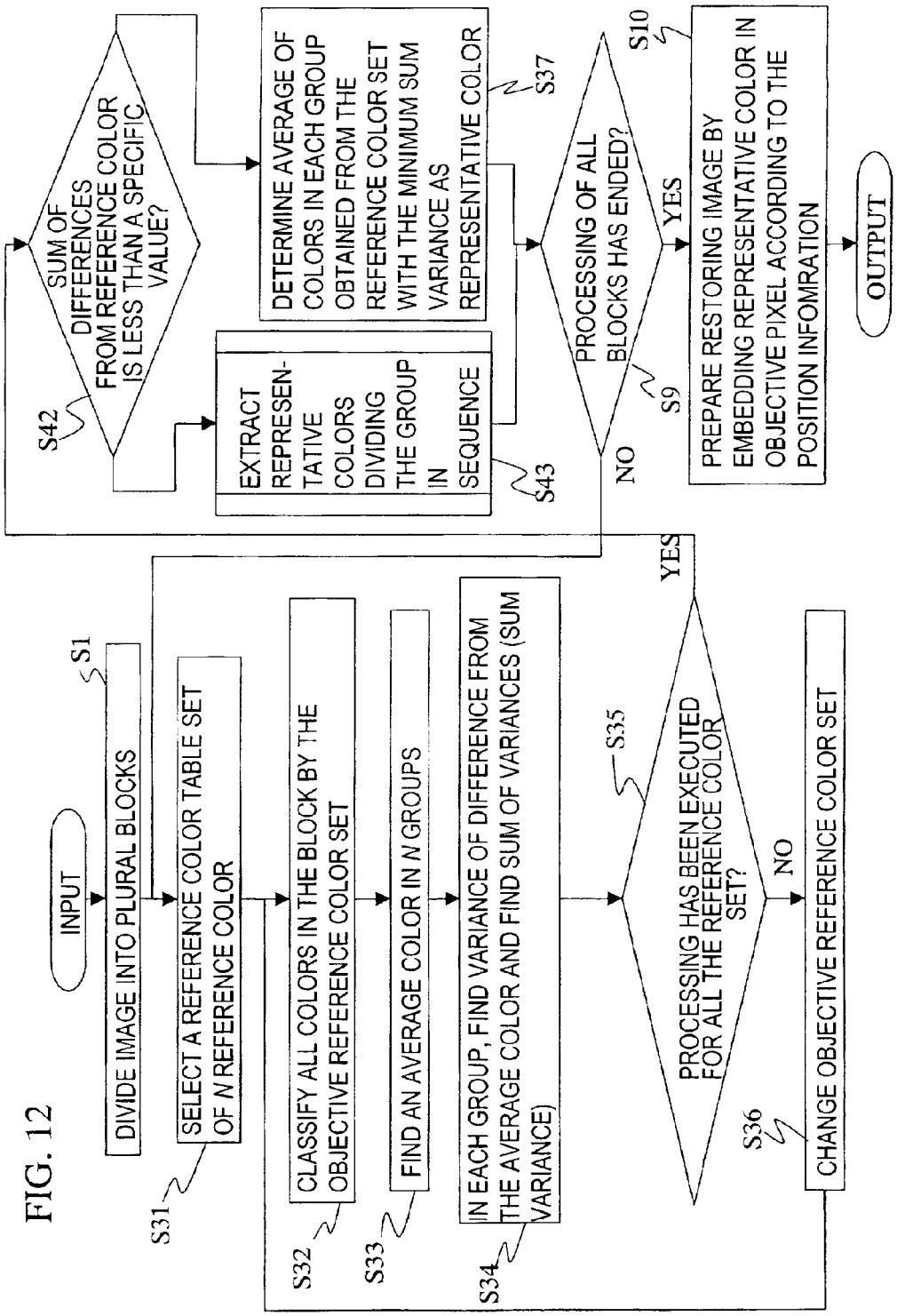
FIG. 12 is a flowchart for illustrating the image processing method in the fourth embodiment of the invention.

In the image processor and the image processing method in the fourth embodiment configured as above, the processing is performed like the flowchart in FIG. 12. Like the third embodiment of the invention, the region dividing mean 21 divides the input image 20 into block regions (S1), and the color data classifying means 101 divides the divided block region k into groups according to the m-th set of reference colors dRIt_m (t=0, ..., n−1) prepared in advance, in result the average eRIt_m (t=0, ..., n−1) in each group is found (S31, S32, S33).

Equation 3:

$$b\_thres\_m = \sum \sum \|eRIt\_m - dRIt\_m\|^2 / n$$

Next, the sequential dividing reference value calculating means 130 finds the sum b_thres_m of the differences between the m-th set of reference colors and the averages eRIt_m in respective groups obtained by the color data classifying means 101 (S41). This processing is performed on all the KK sets of the reference colors prepared previously (S35, S36), and the sequential division judging means 131 compares the minimum value of the sum b_thres_m and the predetermined reference value Bthreshold (S42). And if the value is less than the reference value, the representative color deciding means 103 determines, as the representative color obtained from the block, the average eRIt_m in each group obtained from the reference color set mb with the minimum of the sum b_thres_m of the differences from the KK sets of reference colors (S37). Besides, the representative color deciding means 103 can also find the representative color as follows. First of all, after finding the sum of absolute deviation values of nt pieces of pixel value data It[j] included in the group t from the average eRIt_m in the group t divided by the m-th set of reference colors concerning r, g, and b axes independently, the mean square value of the result for each axis is calculated. After finding the sum value δ_m (the variance from the average) adding the above values in all the groups t, the group dividing is performed by using the reference color set mbd giving the minimum variance δ_m. At this time, the obtained average eRIt_mb in each group is determined as the representative color obtained from the block.

Meanwhile, if the minimum value of b_thres_m is lager than the reference value Bthreshold predetermined by the sequential division judging means 131, the sequential representative color deciding means 132 performs the sequential representative color deciding processing (S34).

The sequential representative color deciding means 132 is provided with the initializing means 22, the target component selecting means 23, the group dividing means 24, the representative color extracting means 25 and the termination judging means 26 in the first embodiment, for example, wherein the same processing as in the first embodiment is performed. In addition, the sequential representative color deciding means 132 may be provided with the initializing means 22, the target component selecting means 23, the group dividing means 24, the second group dividing means 70, the representative color extracting means 25 and the termination judging means 26, wherein the same processing as in the second embodiment may be performed.

After the processing for all the blocks is completed, at the end the objective region approximating means 27 uses the representative colors and the position information obtained by the representative color deciding means 103 or the sequential representative color deciding means 132, thereby it is possible to obtain the approximate output image 28 (S10).

In the fourth embodiment as described above, in case of approximating the pixel color data in the block region obtained from the input image, if the data comparatively agrees with the reference colors in the prepared table, it is easy to perform the group dividing and find the representative color in each group by using the reference colors, which is conductive to the reduction of the processing. Meanwhile, like the third embodiment, in case of applying the reference colors in the table uniformly, if there is a large difference between the reference colors and the average in the group based on them, there is a possibility that the precision of extracting the representative colors would be reduced. However, even in such case the invention can improve the precision of extracting the representative color by performing the group dividing according to the distribution of the color data in actual region like the first and second embodiments.

Besides, those processing can be also carried out by the software processing using the central processing unit (CPU) applied to the computer, the digital signal processor (DSP) and the like according to the image processing method in the fourth embodiment of the invention. Moreover, those processing can be also carried out by using the semiconductor chip prepared based on the image processing method in the fourth embodiment of the invention.

Embodiment 5

Figure 14:
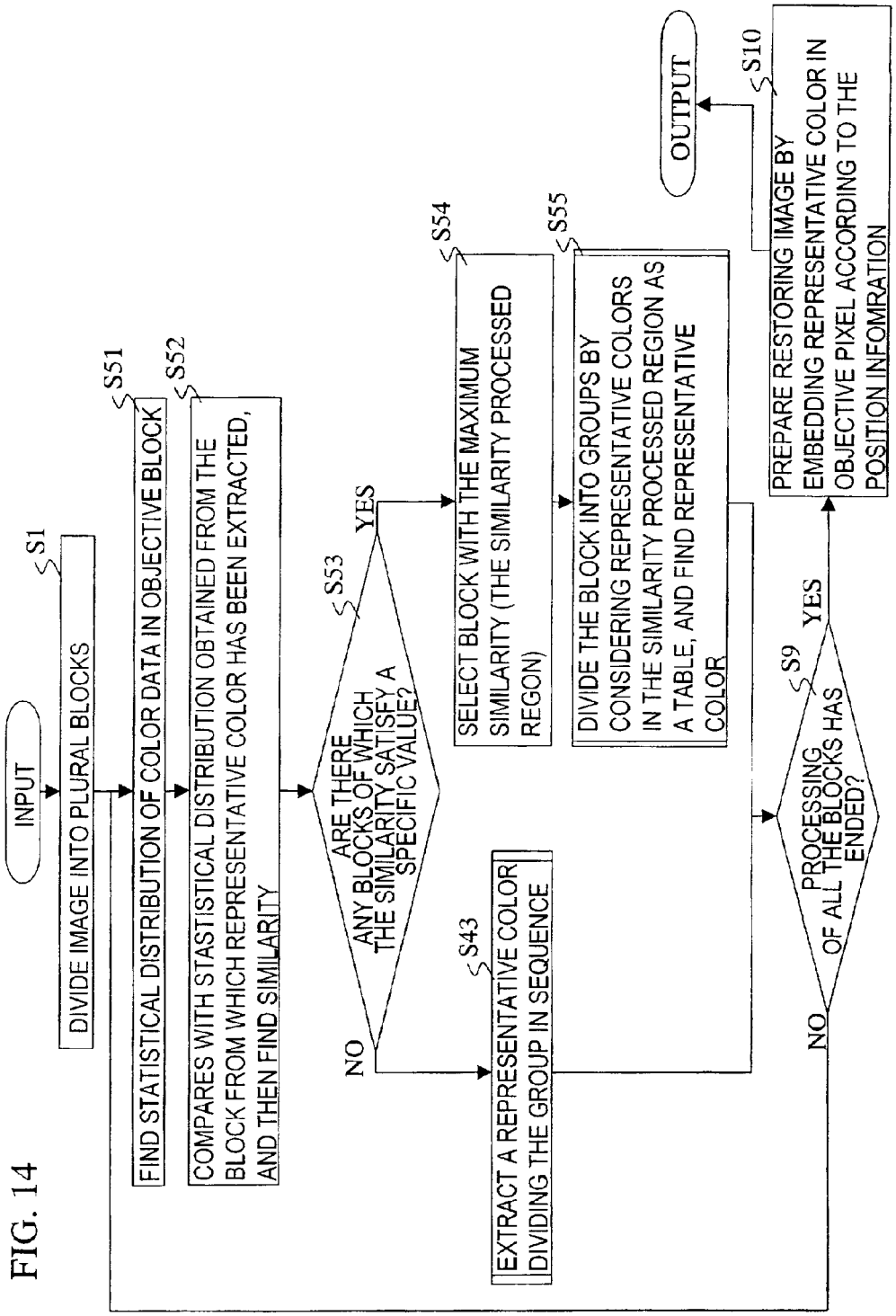
FIG. 14 is a flowchart for illustrating the image processing method in the fifth embodiment of the invention.
Figure 15:
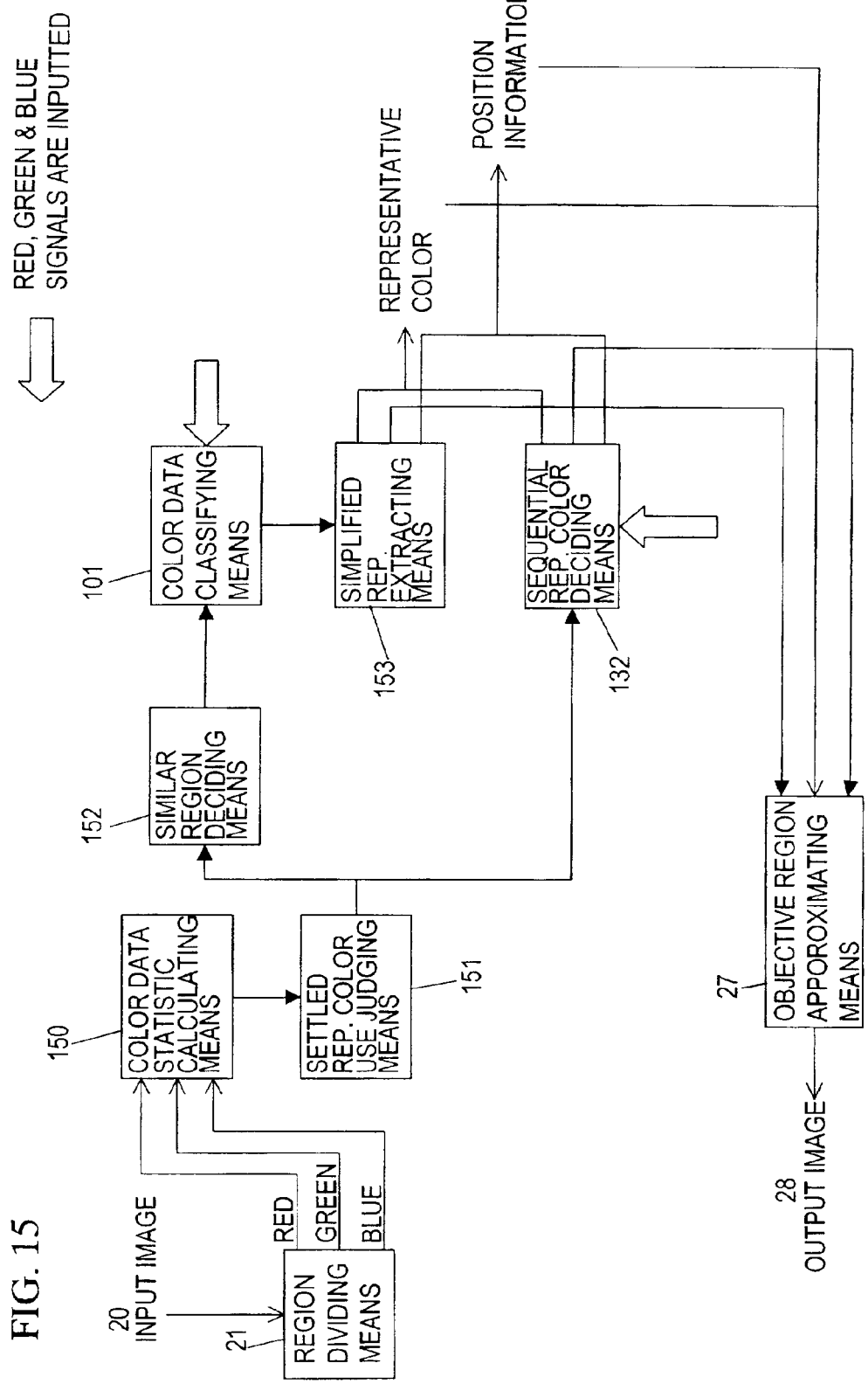
FIG. 15 is a block diagram showing a configuration of the image processor in the fifth embodiment of the invention.

The following description explains about the image processing method and the image processor in the fifth embodiment of the invention. FIG. 15 shows the configuration of the image processor in the fifth embodiment, and FIG. 14 shows a flowchart of the processing of the image processing method in the fifth embodiment. In the image processor shown in FIG. 15, color data statistic calculating means 150 finds the statistical distribution of the color data in the objective region. Settled representative color use judging means 151 compares the color data statistic value obtained by the color data statistic calculating means 150 and the statistic value of the region from which the representative colors have been extracted, and then judges whether the representative color of this extracted-from region is used or not. In case where the settled representative color use judging means 151 determined the use, similar region deciding means 152 selects an extracted-from region with the most similarity. Simplified representative extracting means 153 finds the representative color of the color data in each group obtained at the group dividing of the color data classifying means 101 based on the representative color selected by the similar region deciding means 152.

The image processing method and the operation of the image processor in the fifth embodiment configured as above are explained hereafter according to a flowchart in FIG. 14. Though the color data in the input image was compared with the prepared plural reference color set tables in the fourth embodiment, in this embodiment the color data in the objective block region k is compared with the representative color obtained from the region wherein the extracting of the representative colors has completed before the step for the objective block region k, and accordingly it is arranged that the group dividing be simplified.

The color data statistic calculating means 150 calculates the color data statistic Len for comparing the color data I_k[i, j] in the objective block k with the color data I_p[i, j] in the extracted-from region p (S51). As an example of the statistic, there are the averaged squared error between mutually corresponding pixel color data, and the average of absolute difference of the histogram of the color data in a block. However the statistic is not always be decided to such value uniquely, and it is possible to consider many methods other than this. The Equation 4 expresses the averaged squared error, and the equation 5 expresses the average of absolute difference of the histogram frequency of the color data in a block.

Equation 4:

$$Len = \sum \|I\_k[i,j] - I\_p[i,j]\|^2 / t\_k\_pix$$

t_k_pix: pixel number in block

Figure 16B:
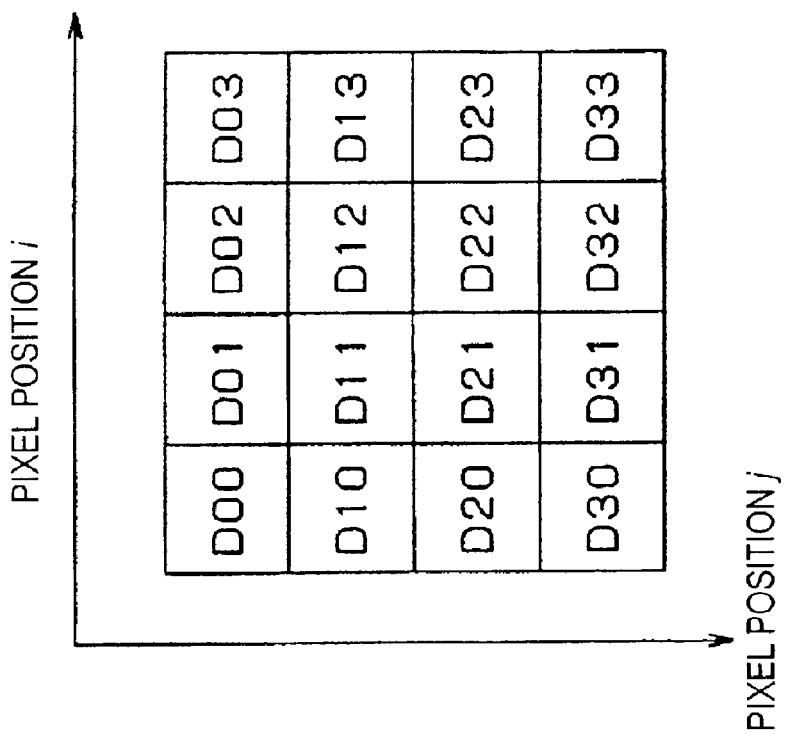
FIGS. 16A and 16B are diagrams showing an example of the color data statistic handled by the image processor in the fifth embodiment of the invention.
Figure 16A:
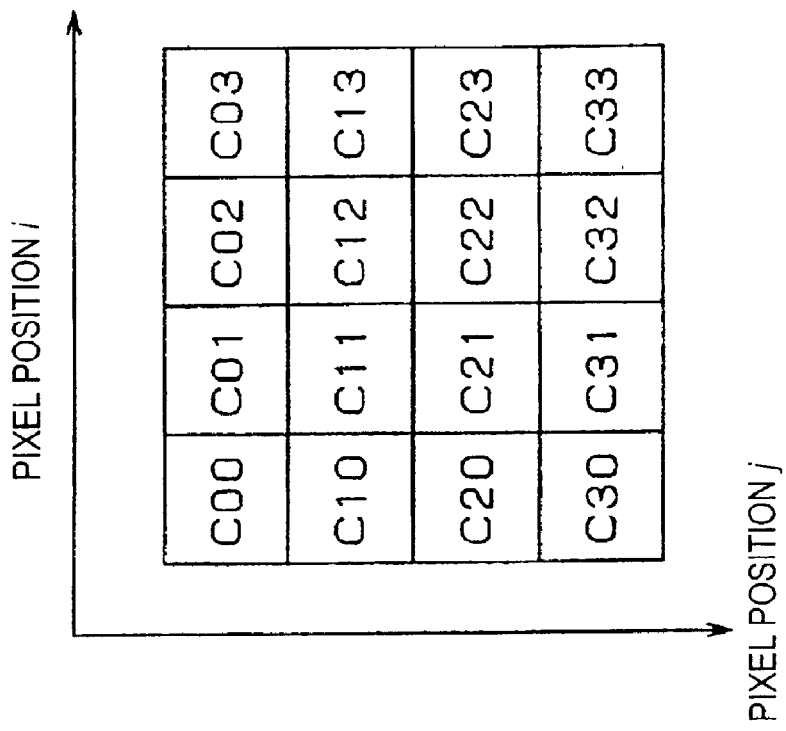

Equation 5:

$$Len = \sum \|n\_k[Ri] - n\_p[Ri]\| / t\_k\_pix$$

t_k_pix: pixel number in block

Where the averaged squared error between the pixel color data is used as the statistic Len, the color data in the comparing objective block corresponding to the color data in the objective block is prepared as shown in FIG. 16, and then similarity can be shown as the value averaging squared errors between the pixel color data. And where the average of absolute difference of the histogram of the color data in a block is used as the statistic Len, after preparing the histogram of the color data in the objective block and the histogram of the color data in the comparing objective block, the value averaging the absolute value of the difference of the histogram by the pixel numbers can estimate the similarity. The former defines that the color data value itself is the reference value, while the latter defines that the frequency of the color is the reference value. The former reference value is preferable if the precision is required, but in such case that the number of color data in the small block is limited. Accordingly, it can be considered that the latter reference value is enough.

The color data statistic calculating means 150 calculates the value for estimating the similarity Len of the distribution of the color data in a region selected based on the objective block region k and the extracted-from region p (S52). The settled representative color use judging means 151 judges based on the similarity Len whether the representative color extracted is used or not (S53). For this judgment, the above statistic is calculated for each processed block, and the minimum value of the statistic is compared with the predetermined reference value PThreshold. If the minimum value of the statistic is less than the reference value, the representative color obtained from the extracted-from region is used. At this time, the selections of the extracted-from region to be used and the representative color are performed by the similar region deciding means 152. Here, the similar region deciding means 152 selects the processed block PP with the minimum statistic of the color data (S54). And using the representative color obtained from the block, the color data classifying means 101 classifies the color data in the objective block region into groups like the third embodiment. The simplified representative extracting means 153 finds the average of the color data included in each group obtained based on the result of the color data classifying means 101, which is defined as the representative color in the group (S55).

On the other hand, in case where the settled representative color use judging means 151 determined that the color data statistic between the objective block and the extracted-from region is larger than the predetermined reference value PThreshold, it may well be that the objective block region be different in the color data distribution from the region the representative color is extracted from. Therefore, in this case, the sequential representative color deciding means 132 performs the group dividing and determines the representative color in each group in sequence (S43). According to such configuration, it is possible to restrain the depression of the precision of extracting representative color from such region.

According to the above configuration and processing, it is possible to avoid the unnecessary sequential group dividing and to perform the approximating of image speedier than ever like the fourth embodiment of the invention. Furthermore, without preparing tables including reference color sets previously detected by plural images like the image processing in the third and fourth embodiments of the invention, the processed regions of image itself are used as tables, so that there is an effect that it is possible to extract more precisely the representative color even from the regions that are not processed sequentially.

Besides, those processing can be also carried out by the software processing using the central processing unit (CPU) applied to the computer, the digital signal processor (DSP) and the like according to the image processing method in the fifth embodiment of the invention. Moreover, those processing can be also carried out by using the semiconductor chip prepared based on the image processing method in the fifth embodiment of the invention.

Embodiment 6

The following explanation refers to the image processing method and the image processor in the sixth embodiment of the invention. FIG. 19 shows a configuration of the image processor in the sixth embodiment, and FIG. 18 is a flowchart for explaining the image processing method in the sixth embodiment.

In the image processor shown in FIG. 19, sequential dividing object deciding means 180 selects plural regions to be divided sequentially among the plural regions divided by the region dividing means 21. Regarding the regions that the sequential dividing object deciding means 180 did not select, adjacent similar region deciding means 181 selects extracted-from regions having the maximum similarity among the plurality of the sequential dividing object regions adjacent to the objective region on the basis of the color data statistic obtained by the color data statistic calculating means 150.

In this embodiment, the sequential representative color extracting is executed regarding the plural block regions obtained by dividing the whole image into blocks like in the first or the second embodiment. After that, when the representative color is extracted from remaining block regions, among the blocks from which the representative color was extracted at the previous step, plural block regions adjacent to the objective block region are selected. And among the sequential processed block regions adjacent to the objective block, the one whose color data distribution is most similar to that in the objective block region is selected. The color data in the objective block region is divided into groups with the representative color at the above step, thereby the representative color is extracted.

Figure 18:
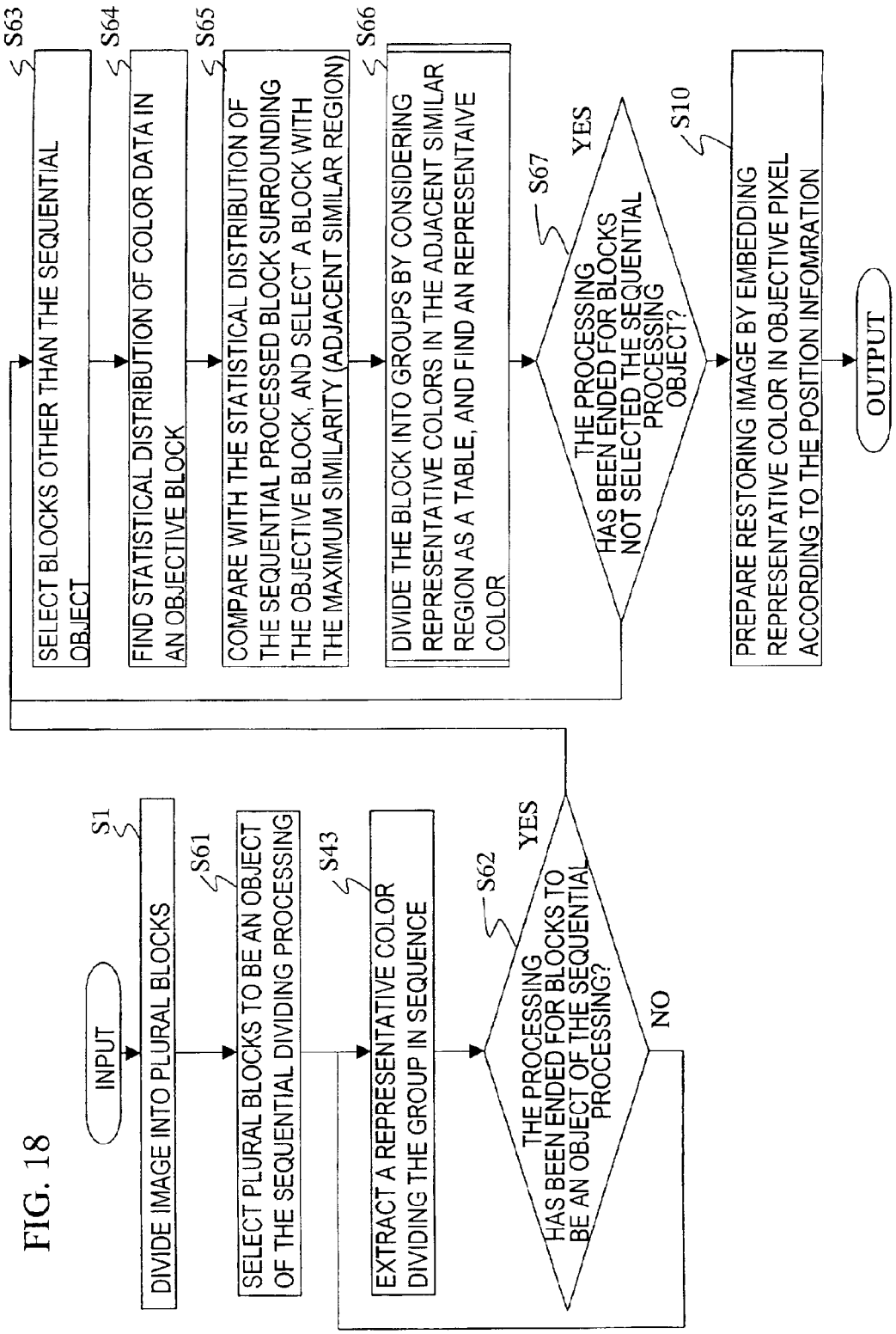
FIG. 18 is a flowchart for illustrating the image processing method in the sixth embodiment of the invention.
Figure 19:
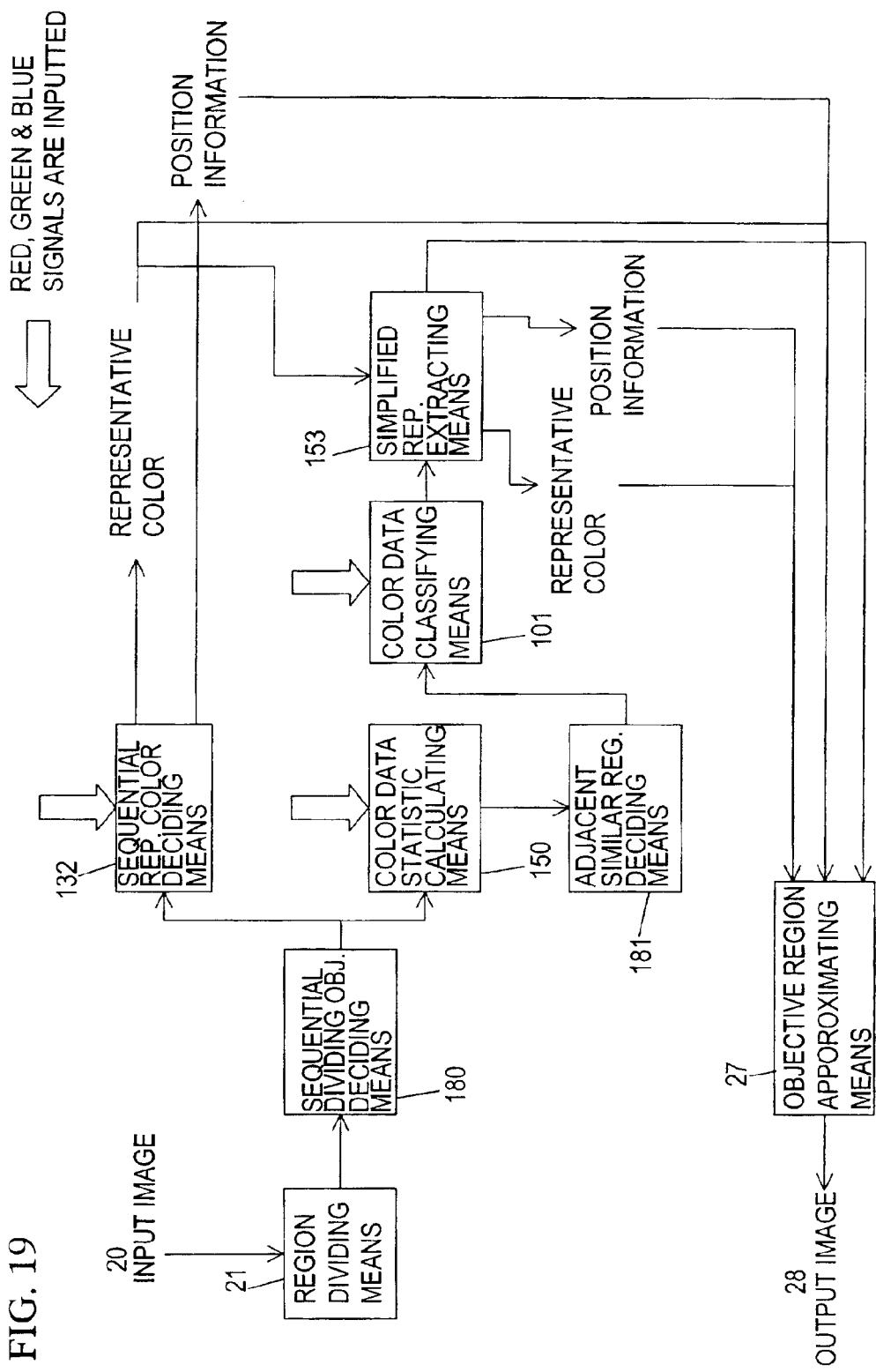
FIG. 19 is a block diagram showing a configuration of the image processor in the sixth embodiment of the invention.

The operation of the image processor and the image processing method in the sixth embodiment configured as above are explained according to the flowchart in FIG. 18. First of all, the input image 20 is divided into plural small regions by the region dividing means 21 (S1). Next, the sequential dividing object deciding means 180 determines among the plural block regions S a region to extract the representative color sequentially therefrom as described in the first or the second embodiment (S61). In this case, it may select any regions, however, it is preferable that the selected regions may be placed as uniformly all over the image as possible, and this is because to keep the precision of extracting the representative color of the regions from which the representative color was not extracted sequentially. For this reason, the region dividing means 21 numbers the divided block regions from the top of the image, and the odd regions are selected as objective regions by the sequential dividing object deciding means 180. Regarding the regions selected by the sequential dividing object deciding means 180, the sequential representative color deciding is executed by the sequential representative color deciding means 132 (S43, S62). If the method described in the first embodiment is applied, the sequential representative color deciding means 132 is provided with the initializing means 22, the target component selecting means 23, the group dividing means 24, the representative color extracting means 25, and the termination judging means 26, and the processing is executed in the same way as the first embodiment. Otherwise, if the method described in the second embodiment is applied, the second group dividing means 70 is further added to the sequential representative color deciding means 132.

Figure 17A:
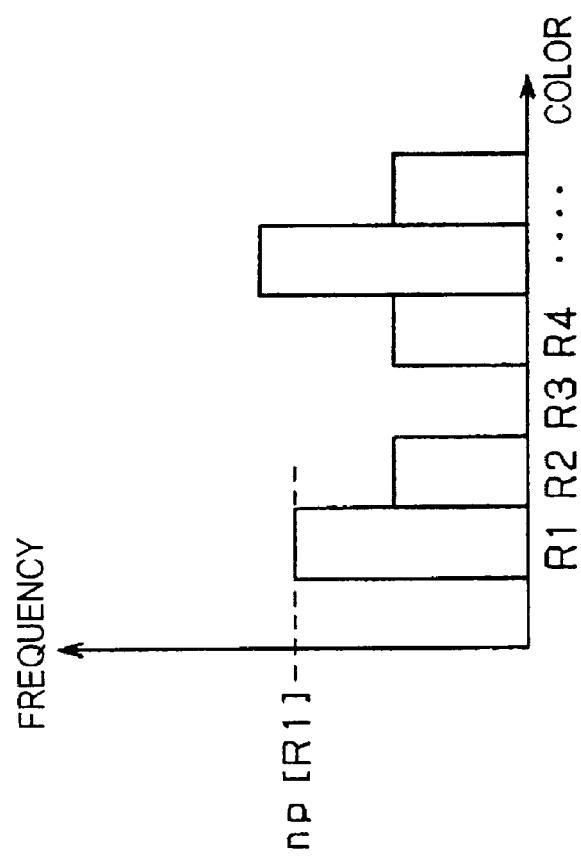
FIGS. 17A and 17B are diagrams showing an example of the color data statistic handled by the image processor in the fifth embodiment of the invention.
Figure 17B:
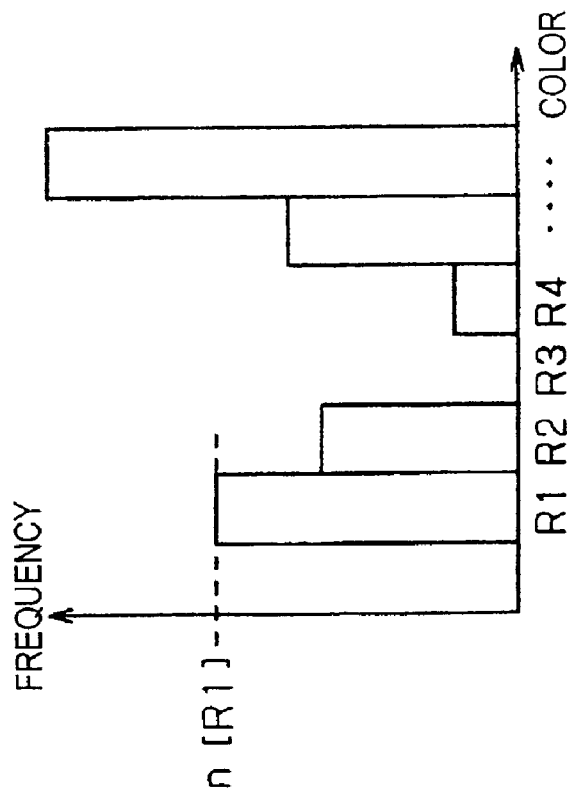

On the other hand, regarding the blocks not selected by the sequential dividing object deciding means 180, the color data statistic calculating means 150 calculates the statistic indicating distribution of the color data in the block (S63, S64). As such value, the value described in the fifth embodiment can be applied (FIG. 16, FIG. 17), otherwise other reference values can be applied too. And the adjacent similar region deciding means 181 selects an appropriate processed block region based on the value calculated from the objective block region and the block region from which the representative color was sequentially extracted and which is adjacent to the block (S65). The color data classifying means 101 executes the group dividing regarding the color data in the objective block region based on the selected representative color. The simplified representative extracting means 153 determines the average of color data included in each group as the representative color in the group (S66). After the processing is completed regarding the block region not selected by the sequential dividing object deciding means 180 (S67), the restoring of image is performed in the same as described before, therefore the explanation is omitted here.

Since the invention is configured in the configuration and method as described above, it is not necessary for preparing the tables including reference color sets previously detected from the plural images. Moreover, it is possible to skip the step of detecting the processed region to be a table as compared with the fifth embodiment.

Besides, those processing can be also carried out by the software processing using the central processing unit (CPU) applied to the computer, the digital signal processor (DSP) and the like according to the image processing method in the sixth embodiment of the invention. Moreover, those processing can be also carried out by using the semiconductor chip prepared based on the image processing method in the sixth embodiment of the invention.

Embodiment 7

Here is discussed about the image processing method and the image processor in the seventh embodiment of the invention. FIG. 21 shows a configuration of the image processor in the seventh embodiment of the invention, and FIG. 20 shows a flowchart for illustrating the image processor in the seventh embodiment.

In the image processor shown in FIG. 21, retention judging means 200 judges whether the present obtained division number satisfies the retention division number or not. When the retention judging means 200 determines to retain the representative color, graded coding retaining means 201 retains the representative color in the present grade and the position information to approximate the small region with the representative color. Maximum termination judging means 202 judges whether the number of the obtained representative colors reaches the maximum specific number, if not, the processing shifts to dividing reference value calculating means. With user image quality selecting means 203, a user selects an image quality mode at the time of approximating the image. When the maximum termination judging means 202 determines the termination, appropriate representative color reading means 204 reads the representative color and the position information according to the user's selected mode from the graded coding retaining means 201 on the basis of the result with the user image quality selecting means 203. In the seventh embodiment, when the representative colors are extracted, it is arranged so as to determine the maximum number of representative colors and the number of representative colors in each grade coming to the maximum of representative colors. And the representative colors and the position information are retained for each grade. According to the mode selected by the user, the image is approximated immediately by using a number of representative colors and the position information corresponding to user's selected mode.

Figure 20:
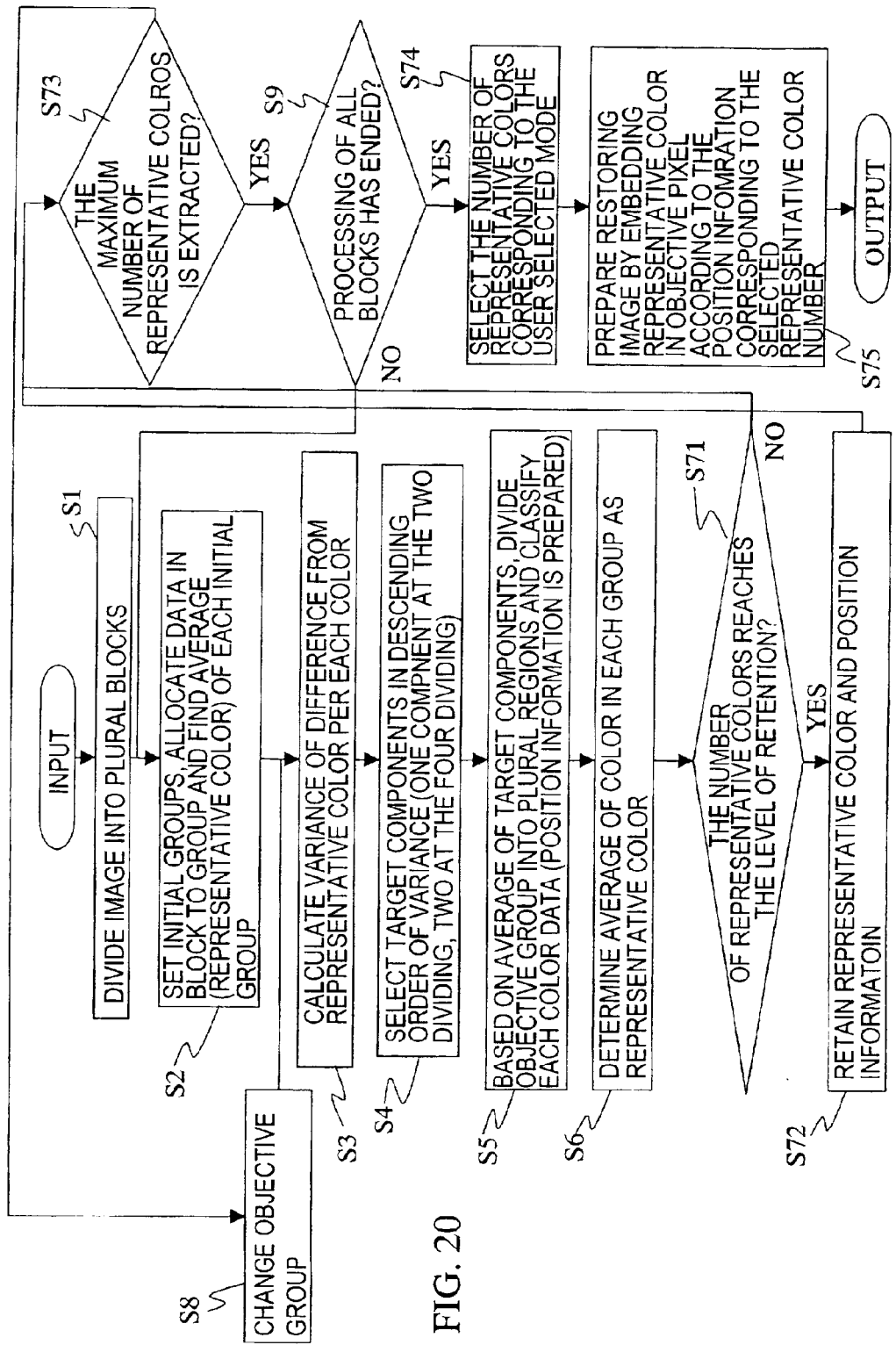
FIG. 20 is a flowchart for illustrating the image processing method in the seventh embodiment of the invention.
Figure 21:
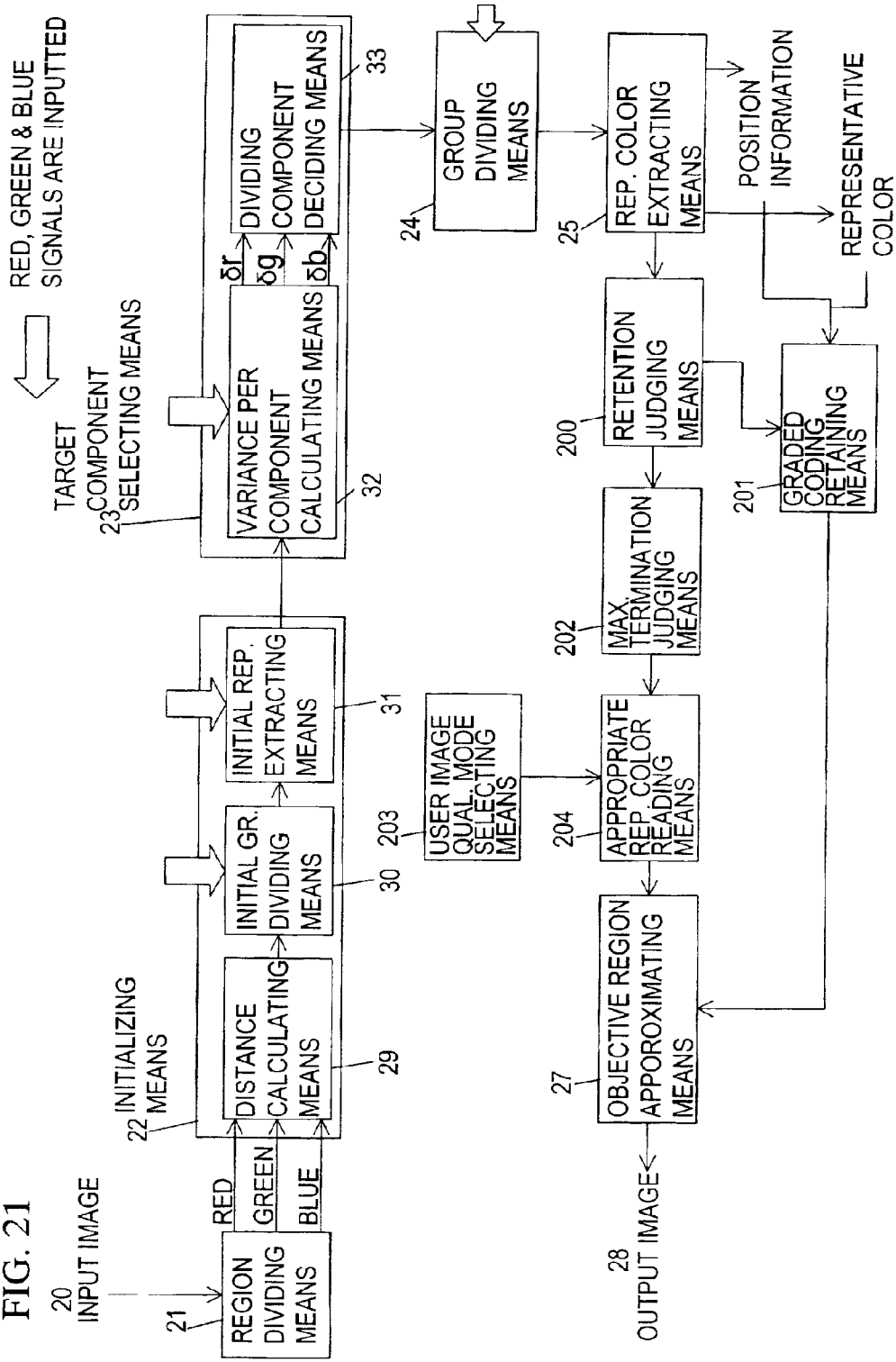
FIG. 21 is a block diagram showing a configuration of the image processor in the seventh embodiment of the invention.

The image processing method and the operation of the image processor in the seventh embodiment are explained according to the flowchart shown in FIG. 20. Like the first embodiment, first, the input image 20 is divided into blocks (S1), each block region is divided into groups, and the representative colors are sequentially extracted therefrom (S2 to S6). The difference here is not to retain only the representative colors obtained finally, but to retain the representative colors and the position information in several grades coming to the final grade. In this case, for instance, if the number of grades coming to the final number of representative colors is three, the data retained by the graded coding retaining means 201 is as shown in FIG. 22. The retention judging means 200 checks whether the number of obtained representative colors reaches the number of colors in the respective established grades coming to the maximum number of representative colors (S71), the result when the number of representative colors reaches the number in the grade is retained by the graded coding retaining means 201 (S72).

Meanwhile, at the moment that the representative colors are obtained by the maximum number determined with the maximum termination judging means 202 for all the blocks (S73, S8, S9), all the retained information is transmitted to the user. The following modes are prepared as the image quality modes to be handled, for example: the high-speed mode without giving much thought of the image quality, the extra fine mode, the intermediate mode, and so on. And the user selects one image quality mode among them with the user image quality selecting means 203 (S74). According to the selected result, in case of the high-speed mode, which needs a small number of representative colors, the number of representative colors in the lowest grade is selected and the image is restored (S75). Meanwhile, in case of the extra fine mode, the maximum number of representative colors is selected and the image is restored. The reading and the judgment of the representative colors are managed by the appropriate color reading means 204.

Besides, the embodiment explains about the case in the qualitative display mode, however it is possible to directly select the number of representative colors to approximate. Additionally, the embodiment explains that at the moment that the maximum termination judging means 202 determines all the processing is ended, the retained information is transmitted to the user, and the appropriate representative color reading means 204 selects the appropriate number of representative colors based on the selected result of the user image quality selecting means 203. However, it is not restricted definitely. The graded data retained by the graded coding retaining means 201 is always transmitted to the user, and while the user is watching the image restored at the transmission, it may be arranged that the user can request to display the image restored by further number of the representative colors. In addition, it can be arranged that, when the user is satisfied with the present image quality although the number of representative colors does not reach the maximum in the present objective block, the user may instruct to abrupt the representative color extracting for the objective block.

Generally, thus compressed image is restored once to the image based on the data transmitted to the user, and then is processed by the image processing like the filtering according to the desired image quality and the resolution. Such processing is executed particularly in case of handling the image data compressed in JPEG. However, like this embodiment, by retaining the representative colors and the position information to approximate the region with the representative colors in multi grades, the invention can cope quickly with the case where the instructions of the plural image quality modes is not clear in advance at the image coding (for example, the image delivery by the Internet). Moreover, when the processing like the filtering is performed for the restored image of such image with lossy compression, there is a possibility of increasing the deformation occurred at the compressing. But since the invention uses all the data obtained from the original image, it is possible to restrain those influences.

Besides, those processing can be also carried out by the software processing using the central processing unit (CPU) applied to the computer, the digital signal processor (DSP) and the like according to the image processing method in the seventh embodiment of the invention. Moreover, those processing can be also carried out by using the semiconductor chip prepared based on the image processing method in the seventh embodiment of the invention.

In the first to the seventh embodiments of the invention, it is not necessary to fix the size of each block at the time of the dividing, but the size may be variable according to the image. And the number of representative colors extracted each block is not necessary to be fixed, but even in case of the variable, it is possible to carry out the contents explained in the invention in the same way. The image processing method and image processor in the first to the seventh embodiments of the invention can be applied to the device for sending and receiving images in real time. Such application objects are the image reader like the mobile scanner, and the system via network camera like the monitoring camera, the TV conference system, and the remote medical monitoring system. In addition, the image processing method and image processor in the first to the seventh embodiments of the invention can be applied to the high-speed display using the fixed color number of the portable terminal like the portable phone and PDA or to the fixed size compression of the printing image data transmitted from the personal computer to the printing device like the ink-jet printer and the color laser printer.

The image processing approximating the color data by using the representative color as above is the application of the human's visual literacy. Considering the human's visual characteristics, the important things to ensure the precision of the approximating are the size of the objective region and the number of representative colors.

The appropriate size of block and the appropriate number of representative colors change according to the image. For instance, if the relation between the resolution of image and the block size is not appropriate, the precision of the approximating gets worse and the image quality of the restored image is deteriorated. In case of providing an image from the image input device like the scanner to the personal computer, it sometimes occurs that the personal computer side converts the resolution of the image to the other resolution after the image input device side performs the approximating. In this case, there is a possibility that the image quality of the image outputted from the personal computer side is deteriorated. The resolution converting here includes the converting along with the enlargement and reduction of the image.

For this reason, after the image is converted at a specific resolution, the block size is preferable to be determined according to the resolution. In case where the specific resolution can be expressed by the converting ratio of the resolution before the converting and that after the converting, the block size may be changed according to the preset converting ratio of the resolution. That is to say, when the resolution is high, the large block is an object, on the other hand, when the resolution is low, the small block is an object. Thereby it is possible to restrain the deterioration due to the human's visual characteristics. Such image processing method is discussed in accordance with FIGS. 23, 24 and 25.

Figure 23:
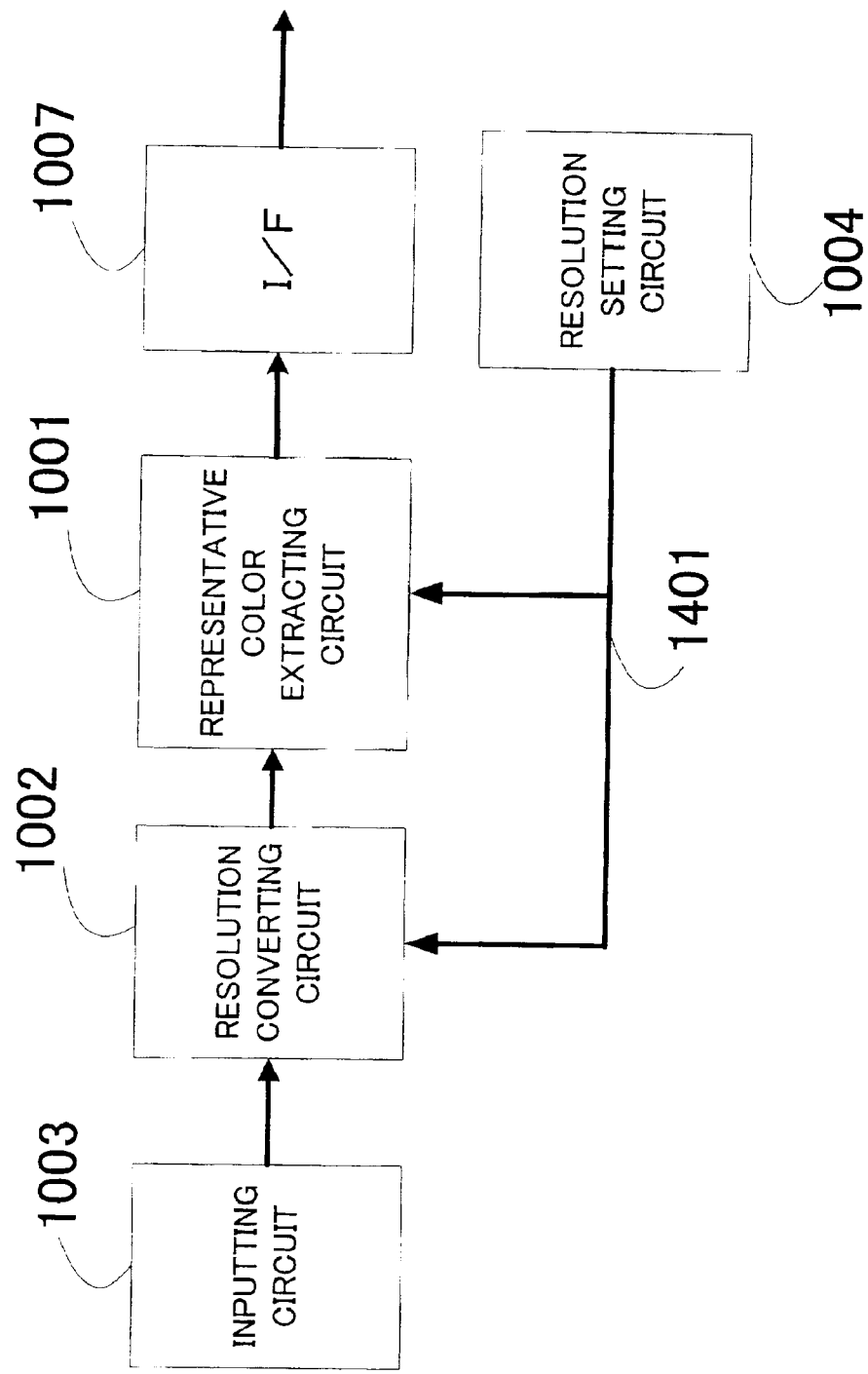
FIG. 23 is a block diagram showing a simple configuration of the image processor provided with a resolution converting circuit.

In the image processor shown in FIG. 23, a resolution converting circuit 1002 is used as means for converting the color image at a specific resolution. For instance, the resolution converting circuit 1002 converts the resolution of the image inputted from an inputting circuit 1003 from the high resolution to the low resolution. A resolution setting circuit 1004 gives the resolution setting to the resolution converting circuit 1002 and the representative color extracting circuit 1001 with a signal 401. A representative color extracting circuit 1001 is applied to region deciding means for deciding the size of the small region to extract the representative color therefrom according to the specific resolution and representative color extracting means for extracting plural representative colors from the decided small region.

In case where the resolution setting is changed from 400 DPI to 200 DPI, for example, the resolution converting circuit 1002 converts each value of adjacent pixels per pair of two pixels to a same value. Next, the representative color extracting circuit 1001 sets the size of this block to a half based on the setting of the resolution. That is to say, in case where the block size is 4 pixels×4 pixels at 400 DPI, the block size at 200 DPI is determined as 2 pixels×2 pixels. Thereby, as much as the change of the original density becomes rough, the precision of the processing gets improved, and the deterioration of image quality can be restrained. Subsequently, the representative color extracting circuit 1001 extracts the representative color of the determined block as described above and outputs the image data to the interface 1007 (which is described as I/F7 hereinafter).

Figure 24:
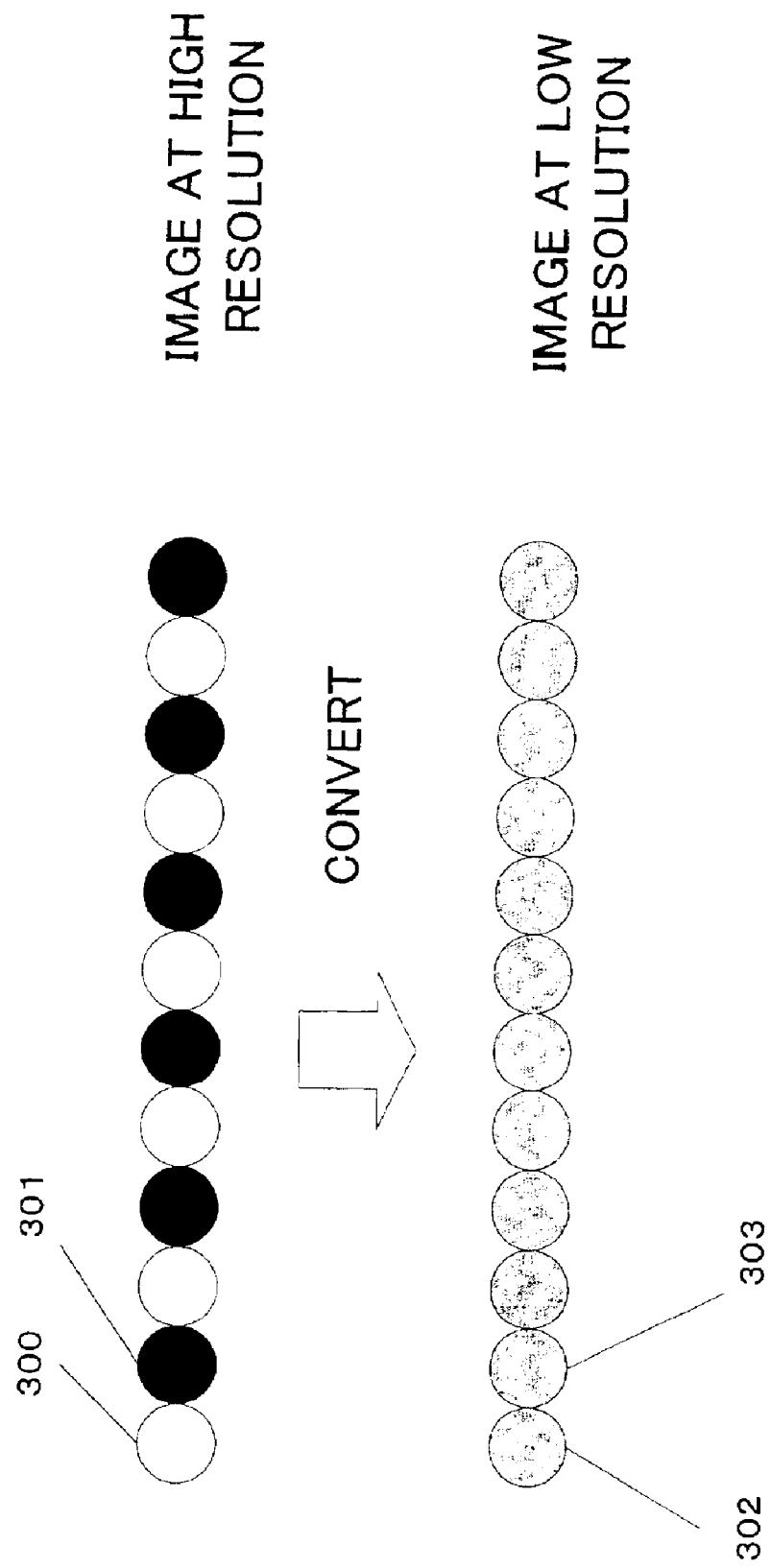
FIG. 24 is a diagram for illustrating the resolution converting.

The resolution converting is explained here in detail according to FIG. 24. As shown in FIG. 24, in case of changing the resolution from 400 DPI to 200 DPI, either one of a signal (data) 300 and a signal (data) 301 is copied to the adjacent pixel. For instance, the signal 301 is copied to both the signals 302 and 303. Thereby, the black and white pattern of 400 DPI has disappeared by the drop of the resolution. In case of the actual processing, the signal 302 and 303 are the same value, so that the thinning processing is performed so as to keep either one value. This processing is equivalent to the reduction processing. That is to say, the resolution converting, and the enlargement and reduction processing are handled as the similar processing (the same processing) as far as the circuit is concerned. Therefore, the resolution converting is frequently used in cased where the number of pixels before the processing is not different from that after the processing, however, the resolution converting of the invention involves the processing along with the enlargement and reduction processing wherein the number of pixels is variable.

In case of the enlargement and reduction processing, the scale may be set instead of the resolution. In this case, the resolution converting circuit 1002 is used as scale changing means for enlargement or reduction of the image into a specific case. And the resolution setting circuit 1004 sets the scale. According to the scale, the resolution converting circuit 1002 increases or reduces the pixel number by using the pixel interpolation processing, the nearest neighbor processing, the bilinear processing, the bi-cubic processing, and the orthogonal transform processing (the DTC transforms and the wavelet transforms), thereby the enlargement and reduction processing are executed.

According to FIG. 25, the processing that the original image is enlarged or reduced is explained hereafter. For instance, as shown in FIG. 25C, when the original image is enlarged in double by inserting one pixel between the adjacent pixels of the original image of 3×3 pixels, the pixel number increases from 9 to 25. In this case, even if the representative color is extracted from the larger block corresponding to the increase of the pixel number, the deterioration of image quality is less. Accordingly, the representative color extracting circuit 1001 enlarges the block size according to the scale. Since the representative color is extracted from the larger region, it is possible to improve the compression ratio. On the other hand, as shown in FIG. 25A, the pixel number decreases in case of the reduction processing. Accordingly, since the space frequency of pattern on the original image gets high, it is necessary for the processing with the high resolution. For that reason, it is preferable that the block size is set smaller. That is to say, the representative color extracting circuit 1001 sets the block size small corresponding to the reduction ratio. Therefore, since it is also possible to retain the pattern with high space frequency, the image quality can be improved.

As described above, if the size of the block to extract the representative color therefrom is changed according to the resolution, even if there are some patterns with high frequency, it is possible to retain it and restrain the deterioration of the image quality. In addition, while keeping the image quality, it is possible to improve the compression ratio.

Besides the resolution appropriate to the original is variable corresponding to the characteristics of the original, such as the photo original, the text original, and the text-photo original. For that reason, the invention can classify the appropriate block size and the representative color number corresponding to the original characteristics. In case of setting the original characteristics to the processing mode, the representative color extracting circuit 1001 may determine the block size and the representative color number corresponding to the processing mode indicating the original characteristics instead of resolution.

Figure 26:
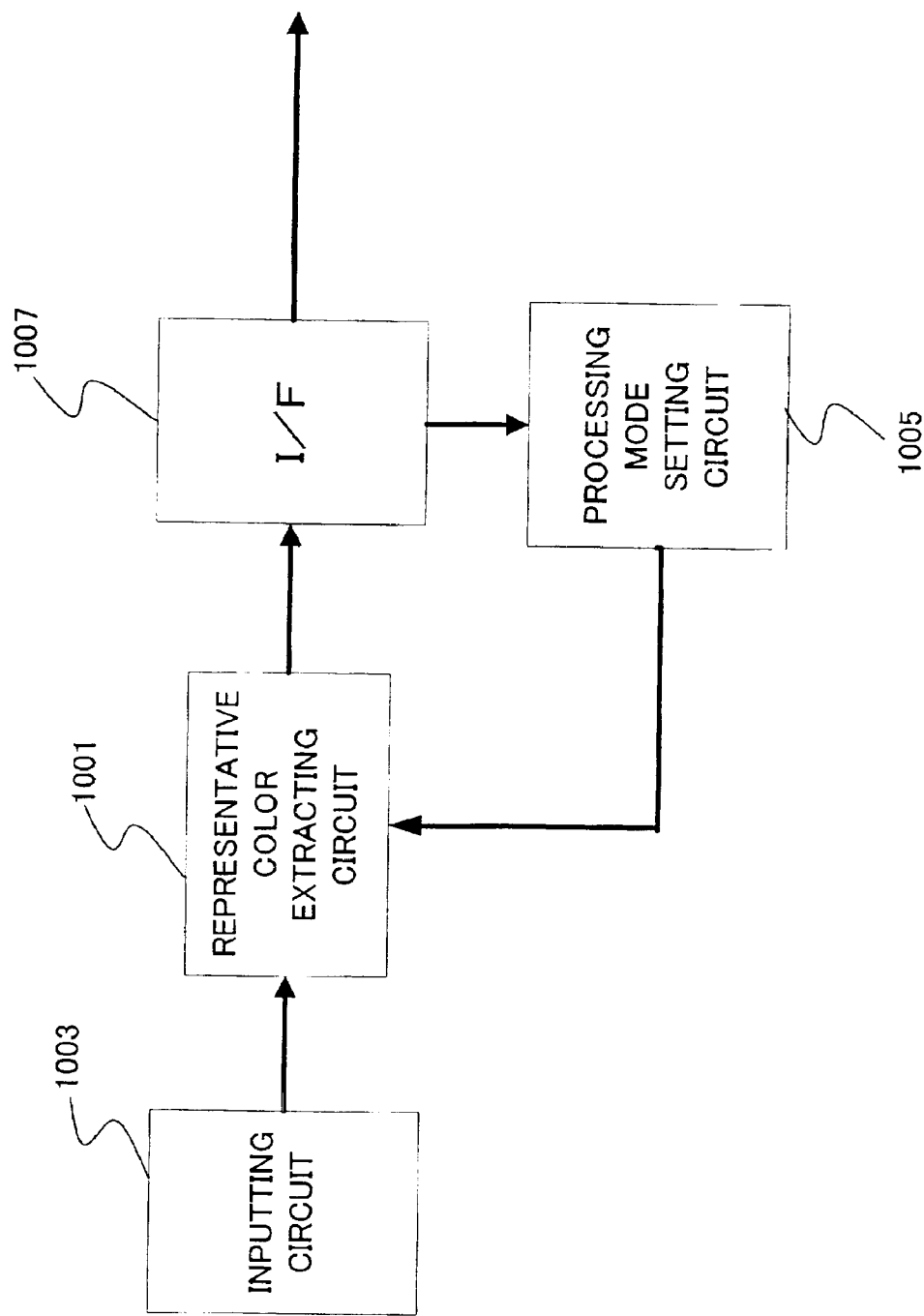
FIG. 26 is a block diagram showing a simple configuration of the image processor provided with the mode setting means.
Figure 28:
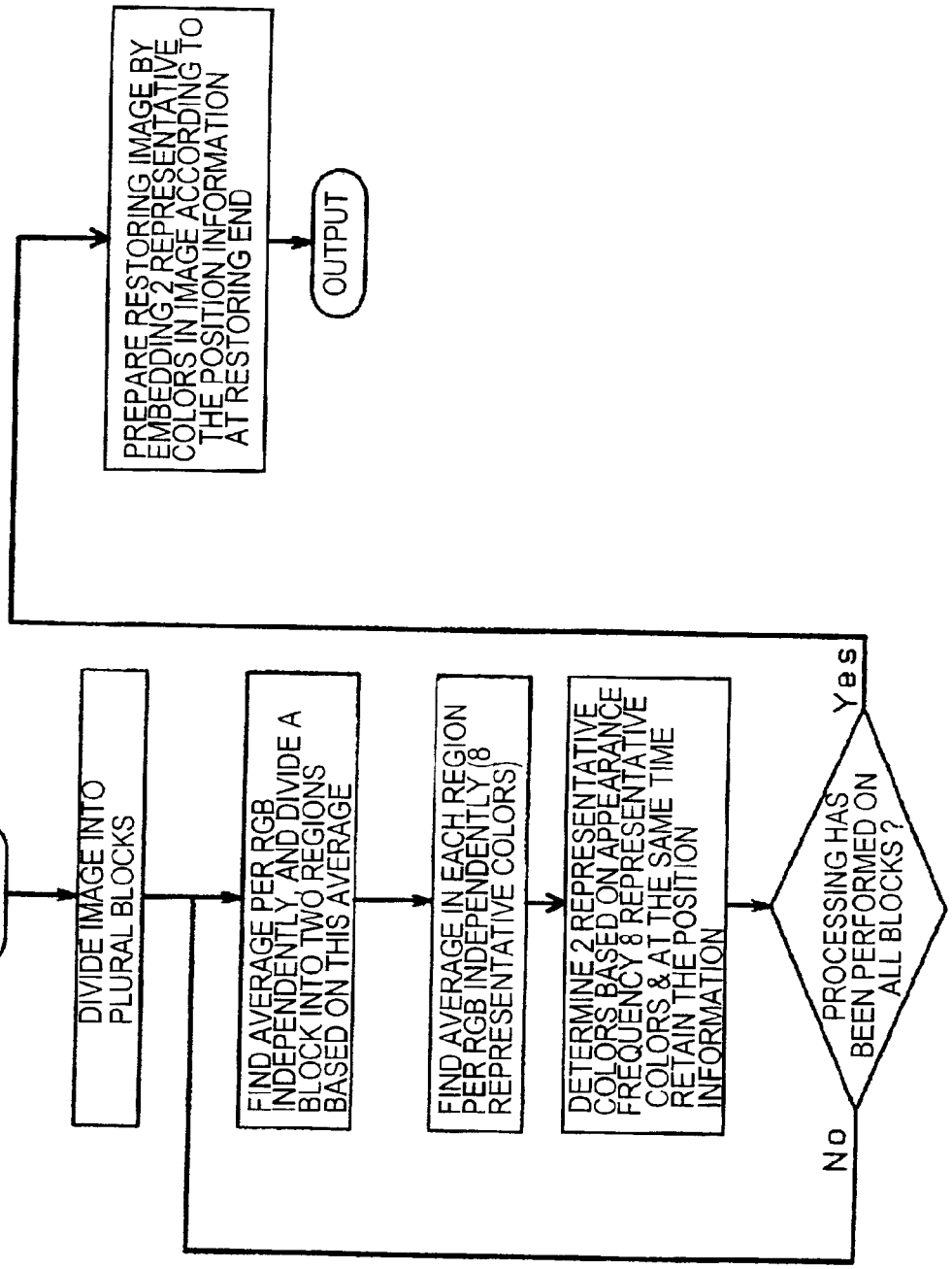
FIG. 28 is a flowchart for illustrating the conventional image processing method.
Figure 29:
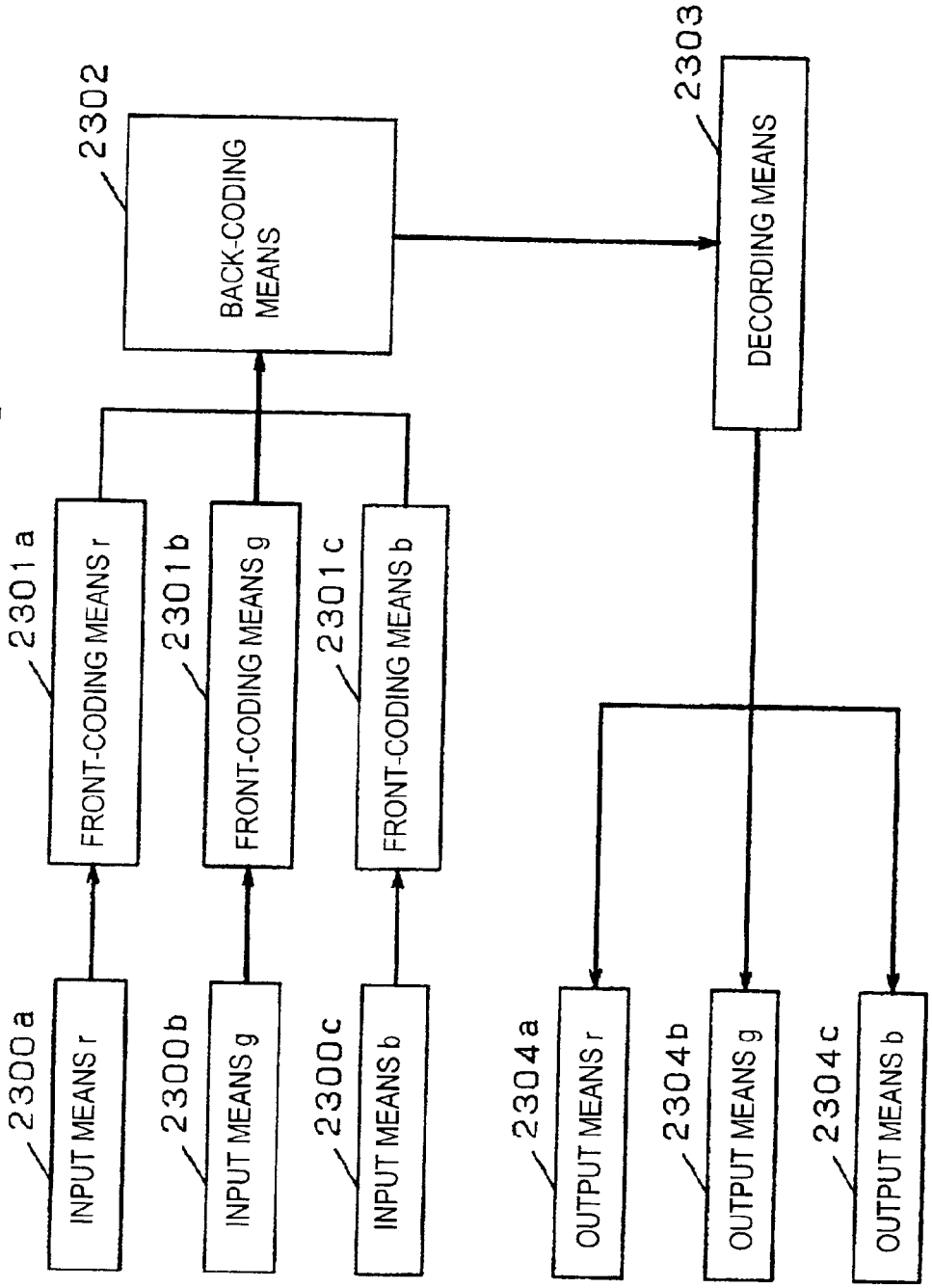
FIG. 29 is a block diagram showing a configuration of the conventional image processor.

In the image processor shown in FIG. 26, a processing mode setting circuit 1005 is used as means for setting the processing mode according to the original to be an object. The processing mode setting circuit 1005 gives the processing mode to the representative color extracting circuit 1001.

For example, as shown in FIG. 27, it is assumed that "the photo mode" and "the text mode" are prepared as the processing mode. In this example, each processing mode is subdivided into two setting modes respectively according to the compression ratio. Each setting mode is correlated with the appropriate block size and the representative color number. The representative color extracting circuit 1001 determines the block size and the representative color number by using the table shown in FIG. 27, for example. When the setting mode set by the processing mode setting circuit 1005 is 1, it is determined that the block size is 4×4 pixels and the representative color number is 2.

Therefore, the resolution necessary for the processing according to original can be set automatically, and it is possible to obtain the high quality image.

As described above, the image processor for determining the block size is carried out by not only the dedicated hardware but also the software processing such as CPU or DSP.

In case where the software processing is carried out, at the time of executing the step for converting the image at a specific resolution, the computer provided with CPU and DSP executes the step for determining the size of the small region to extract the representative color therefrom according to the specific resolution. After that, the computer executes the step for extracting plural representative colors from the determined small region.

In case of enlarging or reducing the image to a specific scale, when the step for enlarging or reducing the image to a specific scale is executed, the computer executes the step for determining the size of the small region to extract the representative color according to the specific scale.

Furthermore, in case of applying the processing mode, after the step for setting the processing mode according to the objective original, the computer executes the step for determining the size of the small region to extract the representative color and the representative color number corresponding to the processing mode.

Besides, though "the text mode" and "the photo mode" are prepared as the processing mode in the example shown in FIG. 27, the processing mode is not limited to this. For example, the other processing mode may be prepared such as "the text-photo mode" of the mixed image, "the map mode", "the enlargement and reduction mode" and so on.

As described above, since in the invention a specific number of groups can be obtained based on the color data in the small region and the reference color in the reference color set table, it is possible to omit the sequential group dividing. In result, the approximating of color data in the small region is performed at high speed and with high precision. Moreover, regarding the region wherein the appropriate reference color set table is not prepared, if the representative color is detected by the sequential group dividing, it is possible to perform the high speed approximating all over the image while restraining the deterioration of the precision.

In addition, in case of selecting a plurality of target components and performing the group dividing based on the reference value of the selected plural dividing target components, even if the group dividing is performed sequentially, the iteration of the repeat decreases. Therefore the approximating is performed at high speed and with high precision.

Additionally, after the group dividing is performed based on the reference value of the selected dividing target components, even in case where each group is subdivided into plural groups based on the color data in each group, the processing iteration for the group dividing decreases. Therefore the approximating is performed at high speed and with high precision.

Moreover, even in case of performing the group dividing sequentially, if the representative color in the small region is detected by using the representative colors of the extracted-from region from which the representative color is extracted, it is only a part of small regions that the sequential group dividing should be performed. Therefore, the approximating all over the image is performed at high speed and with high precision.

What is claimed is:

1. An image processing method comprising the steps of:
   dividing an input image into a plurality of small regions;
   dividing color data in a small region of the plurality of small regions into a specific number of groups based on the color data in the small region and reference colors in a prepared table;
   extracting a representative color from each of the obtained groups; and
   approximating the color data in the small region by using a specific number of the obtained representative colors.

2. An image processing method according to claim 1 comprising the steps of:
   judging, after dividing the input image into the small regions, based on a reference value obtained from the color data in the small region and the reference colors in the prepared table whether the color data in the small region should be divided into a specific number of groups by the reference colors;
   in case where the color data in the small region is not divided into a specific number of groups by the reference colors according to the above judgment,
   selecting a dividing target component based on distribution of color data in the small region and then dividing the small region into groups based on specific reference;
   extracting a representative color from each of the obtained groups; and
   obtaining a specific number of the representative colors to approximate the color data in the small region by repeating the steps from the selecting of the dividing target component through the extracting of the representative colors until a specific number of the representative colors are obtained.

3. An image processing method comprising the steps of:
dividing an input image into a plurality of small regions;
selecting plural dividing target components based on distribution of color data in a small region of the plurality of small regions and then dividing the color data in the small region into a plurality of groups based on a criterion regarding the selected dividing target components;
extracting a representative color from each of the plurality of groups; and
approximating, after repeating the steps from the selecting of the dividing target components through the extracting of the representative colors until a specific number of the representative colors are obtained, the color data in the small region by using the specific number of the obtained representative colors.

4. An image processing method according to claim 3, wherein the representative color representing each of the plurality of groups is equivalent to the average of the color data in the group and a plurality of the dividing target components are selected among respective components of the color data in descending order of variance against the average.

5. An image processing method according to claim 3, wherein grades of the specific number are established, and said method comprising the steps of:
retaining the representative colors in each grade and information for approximating the color data in the small region with the representative colors in repeating the steps from the selecting of the dividing target components through the extracting of the representative color of each group until the representative colors are obtained by a maximum number of the specific number;
when the color data in each small region is approximated by using the obtained representative colors, if a user selects either one among image quality modes,
approximating the color data in the small region by using the representative colors in each grade according to the selected mode.

6. An image processing method comprising the steps of:
dividing an input image into a plurality of small regions;
selecting a dividing target component based on distribution of the color data in a small region of the plurality of small regions and then dividing the color data in the small region into groups based on a criterion regarding the selected dividing target component;
subdividing each group into plural groups based on the color data in each group;
extracting a representative color from each of the obtained groups; and
approximating, after repeating the steps from the selecting of the dividing target component through the extracting of the representative colors until a specific number of the representative colors are obtained, the color data in the small region by using a specific number of the obtained representative colors.

7. An image processing method according to claim 6, comprising the steps of:
selecting the dividing target component of which the variance against the average of the color data is the greatest among respective components of the color data in the group; and
subdividing each group into plural groups based on a Euclid distance value between the origin and each color data in the small region.

8. An image processing method according to claim 3 or 6, comprising the steps of:
judging whether sequential representative color extracting for repeating the steps from the selecting of the dividing target component through the extracting of the representative color from each group should be executed or not for an objective small region, by comparing distribution of color data in the objective small region and that in an extracted-from region from which the representative color has been extracted; and
in case where the sequential representative color extracting is not executed according to the above judgment,
dividing the color data in the small region into groups based on the representative colors representing the extracted-from region selected by the distribution of the color data in the objective small region;
extracting a representative color from each of the obtained groups; and
approximating the color data in the small region with the obtained representative colors.

9. An image processing method according to claim 8, wherein the above judgment should be executed based on a similarity between a histogram of the color data in the objective small region and a histogram of the color data in the extracted-from region.

10. An image processing method according to claim 3 or 6, wherein sequential representative color extracting for repeating the steps from the selecting of the dividing target component through the extracting of the representative colors until a specific number of the representative colors are obtained is executed only for the small region selected based on a predetermined criterion, and
for the small region not selected,
dividing the color data in the small region into plural groups based on the representative color in an extracted-from region from which the representative color has been extracted;
extracting a representative color from each of the obtained groups; and
approximating the color data in the small region by the obtained representative colors.

11. An image processing method according to claim 3 or 6, wherein a group including all the color data in the small region is set as an initial group, and the initial group is divided into plural groups based on the criterion regarding the dividing target component.

12. An image processing method according to claim 3 or 6, wherein plural groups defined by a Euclid distance between the origin and each color data in the small region are set as initial groups, and each initial group is divided into plural groups based on the criterion regarding the dividing target component.

13. An image processor comprising:
region dividing means for dividing an input image into a plurality of small regions;
a reference color table set including a prepared set of reference colors;
color data classifying means for dividing the color data in a small region of the plurality of small regions into a specific number of groups based on the color data in the small region and the reference colors in the table;
representative color deciding means for finding a representative color of the color data in each of the obtained groups; and
objective region approximating means for approximating the color data in each small region by using a specific number of the obtained representative colors.

14. An image processor according to claim 13, comprising summed-up variance calculating means for calculating a sum of variances from an average of the color data in each group obtained by the color data classifying means, and wherein the representative color deciding means finds the representative color of the color data in each of the obtained groups by using the calculation result of the summed-up variance calculating means.

15. An image processor according to claim 13, comprising:
sequential dividing reference value calculating means for calculating a dividing reference value based on the average of the color data in each group obtained by the color data classifying means and the reference colors used by the color data classifying means;
sequential representative color deciding means for repeating, until a specific number of the representative colors are obtained, the dividing of an objective group into plural groups using a criterion regarding the dividing target component selected based on distribution of the color data in the objective group and the deciding of the representative color of each of the obtained groups; and
sequential division judging means for judging based on the dividing reference value whether the sequential representative color deciding means should decide the representative color or not,
and wherein the objective region approximating means, in case where the representative color is decided by the sequential representative color deciding means according to the judgment of the sequential division judging means, approximates the color data in each small region by using a specific number of the representative colors obtained by the sequential representative color deciding means.

16. An image processor comprising:
region dividing means for dividing an input image into a plurality of small regions;
initializing means for setting an initial group for the small region, classifying all the color data in a small region of the plurality of small regions to the initial group, and finding the representative color of the initial group;
target component selecting means for selecting plural dividing target components to be targeted at the dividing of an objective group based on distribution of the color data in the objective group;
group dividing means for dividing the objective group into plural groups based on the obtained dividing target components and classifying the color data in the objective group to the groups obtained after the dividing;
representative color extracting means for selecting a representative color of the color data in each group obtained by the group dividing means;
termination judging means for judging whether a specific number of the representative colors are obtained or not; and
objective region approximating means for approximating, in case where, after repeating the selecting of the dividing target components by the target component selecting means, the group dividing by the group dividing means and the representative color extracting by the representative color extracting means until a specific number of the representative colors are obtained, the termination judging means judges that a specific number of representative colors are obtained, the color data in the small region by using a specific number of the obtained representative colors.

17. An image processor according to claim 16, wherein the target component selecting means comprises variance per component calculating means for calculating a variance between a representative color and each component of color data in an objective group, and dividing component deciding means for determine dividing target components from the components in descending order of the variance of the component obtained by the variance per component calculating means.

18. An image processor according to claim 16, comprising:
retention judging means for judging whether representative colors in respective grades established for the specific number are obtained;
graded coding retaining means for retaining, in case where the retention judging means determines the representative colors are obtained, the representative colors in the respective grades and position information for approximating the color data in the small region by using the representative colors;
user image quality selecting means for a user selecting either one among image quality modes; and
appropriate representative color reading means for reading the representative colors and the position information corresponding to the selected mode from the graded coding retaining means according to the selecting result with the user image quality selecting means; and
said image processor wherein the termination judging means judges whether a maximum specific number of the representative colors are obtained, and the objective region approximating means approximates the color data in each of the small regions by using the representative colors obtained by the appropriate representative color reading means in case where the termination judging means determines that a maximum specific number of the representative colors are obtained.

19. An image processor comprising:
region dividing means for dividing an input image into a plurality of small regions;
initializing means for setting an initial group for a small region of the plurality of small regions and classifying all color data in the small region to the initial group and calculating a representative color of the initial group;
target component selecting means for selecting a dividing target component to be targeted at the dividing of an object group based on distribution of the color data in the objective group;
group dividing means for dividing the objective group into plural groups according to the obtained divided target component and classifying the color data in the objective group to the groups obtained after the dividing;
second group dividing means for subdividing each group into plural groups based on the distribution of color data in each group obtained by the above group dividing means and classifying the color data in each group into groups obtained after the dividing;
representative color extracting means for finding the representative color of the color data in each group obtained by the second group dividing means;
termination judging means for judging whether a specific number of the representative color are obtained or not; and objective region approximating means for approximating, in case where, after repeating the selecting of the dividing target components by the target component selecting means, the group dividing by the group dividing means and by the second group dividing means, and the representative color extracting by the representative color extracting means, the termination judging means judges that a specific number of representative colors are obtained, the color data in the small region by using a specific number of the obtained representative colors.

20. An image processor according to claim 19 wherein the second group dividing means comprises supplementary dividing reference calculating means for calculating a Euclid distance from the origin of the color data in each group obtained by the group dividing means, and group subdividing means for subdividing the group obtained by the group dividing means based on the calculation result of the supplementary dividing reference calculating means and classifying the color data in the objective group to the groups obtained after the dividing.

21. An image processor according to claim 16 or 19 comprising:

color data statistic calculating means for calculating statistic distribution of the color data in the small region;

settled representative color use judging means for judging, by comparing the statistical distribution of the color data and statistical distribution obtained from an extracted-from region from which the representative color has been extracted, whether the representative color in the extracted-from region is used or not;

similar region deciding means for selecting the extracted-from region where a similarity to the small region is the greatest;

color data classifying means for dividing the color data in the small region into a specific number of groups based on the color data in the small region and the representative color in the selected extracted-from region; and simplified representative extracting means for extracting the representative color of the color data in each group obtained by the color data classifying means, and wherein the objective region approximating means approximates the color data in each small region by using a specific number of representative colors obtained by the simplified representative color extracting means, in case where the settled representative color use judging means determined that the representative color in the extracted-from region is used.

22. An image processor according to claim 16 or 19 comprising:

sequential dividing object deciding means for selecting a region of which a representative color is decided by the representative color deciding means;

color data statistic calculating means for calculating a statistic of the color data in the small region;

adjacent similar region deciding means for comparing a statistic obtained from, of extracted-from regions from which the representative color have been extracted, an extracted-from region adjacent to a small region not selected by the sequential dividing object deciding means and the statistic in the small region, and selecting the extracted-from region with the greatest similarity to the small region; and simplified representative extracting means for dividing the color data in an objective region into a specific number of groups based on the representative color of the extracted-from region selected by the adjacent similar region deciding means and finding the representative color in each group, and wherein the objective region approximating means approximates the color data in each small region not selected by the sequential dividing object deciding means by using a specific number of representative colors obtained by the simplified representative extracting means.

23. An image processor according to claim 16 or 19 wherein the initializing means comprises distance calculating means for calculating a Euclid distance from the origin of the color data in the small region, initial group dividing means for dividing all the color data in the small region into plural groups based on the Euclid distance, and initial representative extracting means for setting an average of the color data in each group obtained by the initial group dividing means as the representative color in the group.

24. An image processor according to claim 16 or 19 wherein the representative color representing the group is an average of the color data in the group.

* * * * *